US009552470B2

(12) United States Patent
Turgeman et al.

(10) Patent No.: US 9,552,470 B2
(45) Date of Patent: Jan. 24, 2017

(54) METHOD, DEVICE, AND SYSTEM OF GENERATING FRAUD-ALERTS FOR CYBER-ATTACKS

(71) Applicant: BioCatch Ltd., Tel Aviv (IL)

(72) Inventors: Avi Turgeman, Cambridge, MA (US); Oren Kedem, Tel Aviv (IL); Uri Rivner, Mazkeret Batya (IL)

(73) Assignee: BioCatch Ltd., Tel Aviv (IL)

( * ) Notice: Subject to any disclaimer, the term of this patent is extended or adjusted under 35 U.S.C. 154(b) by 83 days.

(21) Appl. No.: 14/675,765

(22) Filed: Apr. 1, 2015

(65) Prior Publication Data

US 2015/0213246 A1     Jul. 30, 2015

Related U.S. Application Data

(63) Continuation-in-part of application No. 14/566,723, filed on Dec. 11, 2014, now Pat. No. 9,071,969, which
(Continued)

(51) Int. Cl.
*G06F 21/00*     (2013.01)
*H04L 29/06*     (2006.01)
(Continued)

(52) U.S. Cl.
CPC ............. *G06F 21/32* (2013.01); *G06F 3/041* (2013.01); *G06F 21/31* (2013.01); *G06F 21/316* (2013.01);
(Continued)

(58) Field of Classification Search
CPC ........ G06F 21/32; G06F 21/31; G06F 21/316; G06F 21/554; G06F 3/041; G06F 2221/2133; H04L 63/08; H04L 63/1408
See application file for complete search history.

(56) References Cited

U.S. PATENT DOCUMENTS

2006/0282660 A1 *   12/2006   Varghese ............. G06Q 20/341
                                                        713/155
2008/0215576 A1 *   9/2008   Zhao ................. G06F 17/30702
(Continued)

FOREIGN PATENT DOCUMENTS

EP            3029596 A1 *    6/2016        G06F 17/30958

OTHER PUBLICATIONS

Emmanouil Vasilomanolakis, Shankar Karuppayah, Panayotis Kikiras, Max Mühlhäuser; "A honeypot-driven cyber incident monitor: lessons learned and steps ahead"; Sep. 2015; SIN '15: Proceedings of the 8th International Conference on Security of Information and Networks; Publisher: ACM; pp. 1-7.*

*Primary Examiner* — David Garcia Cervetti
*Assistant Examiner* — Courtney Fields
(74) *Attorney, Agent, or Firm* — Eitan, Mehulal & Sadot

(57) ABSTRACT

Devices, systems, and methods of detecting user identity, differentiating between users of a computerized service, and detecting a cyber-attacker. An end-user device (a desktop computer, a laptop computer, a smartphone, a tablet, or the like) interacts and communicates with a server of a computerized server (a banking website, an electronic commerce website, or the like). The interactions are monitored, tracked and logged. User Interface (UI) interferences are intentionally introduced to the communication session; and the server tracks the response or the reaction of the end-user to such communication interferences. The system determines whether the user is a legitimate human user; or a cyber-attacker posing as the legitimate human user. The system displays gauges indicating cyber fraud scores or cyber-attack threat-levels. The system extrapolates from observed fraud incidents and utilizes a rules engine to automatically search for similar fraud events and to automatically detect fraud events or cyber-attackers.

38 Claims, 8 Drawing Sheets

Related U.S. Application Data is a continuation of application No. 13/922,271, filed on Jun. 20, 2013, now Pat. No. 8,938,787, which is a continuation-in-part of application No. 13/877,676, filed as application No. PCT/IL2011/000907 on Nov. 29, 2011, now Pat. No. 9,069,942, application No. 14/675,765, which is a continuation-in-part of application No. 14/320,653, filed on Jul. 1, 2014, now Pat. No. 9,275,337, application No. 14/675,765, which is a continuation-in-part of application No. 14/320,656, filed on Jul. 1, 2014, application No. 14/675,765, which is a continuation-in-part of application No. 14/325,393, filed on Jul. 8, 2014, application No. 14/675,765, filed on Apr. 1, 2015, which is a continuation-in-part of application No. 14/325,394, filed on Jul. 8, 2014, application No. 14/675,765, filed on Apr. 1, 2015, which is a continuation-in-part of application No. 14/325,395, filed on Jul. 8, 2014, application No. 14/675,765, which is a continuation-in-part of application No. 14/325,396, filed on Jul. 8, 2014, application No. 14/675,765, which is a continuation-in-part of application No. 14/325,397, filed on Jul. 8, 2014, now Pat. No. 9,450,971, application No. 14/675,765, which is a continuation-in-part of application No. 14/325,398, filed on Jul. 8, 2014, now Pat. No. 9,477,826.

(60) Provisional application No. 61/973,855, filed on Apr. 2, 2014, provisional application No. 61/417,479, filed on Nov. 29, 2010, provisional application No. 61/843,915, filed on Jul. 9, 2013, provisional application No. 61/843,915, filed on Jul. 9, 2013, provisional application No. 61/843,915, filed on Jul. 9, 2013, provisional application No. 61/843,915, filed on Jul. 9, 2013, provisional application No. 61/843,915, filed on Jul. 9, 2013, provisional application No. 61/843,915, filed on Jul. 9, 2013, provisional application No. 61/843,915, filed on Jul. 9, 2013, provisional application No. 61/843,915, filed on Jul. 9, 2013.

(51) Int. Cl.
| | |
|---|---|
| *G06F 21/32* | (2013.01) |
| *G06F 21/55* | (2013.01) |
| *G06F 3/041* | (2006.01) |
| *G06F 21/31* | (2013.01) |
| G06F 21/57 | (2013.01) |
| H04L 12/24 | (2006.01) |

(52) U.S. Cl.
CPC ............ *G06F 21/554* (2013.01); *H04L 63/08* (2013.01); *H04L 63/1408* (2013.01); *G06F 2221/2133* (2013.01)

(56) References Cited

U.S. PATENT DOCUMENTS

2011/0251823 A1\* 10/2011 Davis .................... G06Q 30/02
702/181
2013/0305357 A1\* 11/2013 Ayyagari ................ H04L 63/14
726/22

\* cited by examiner

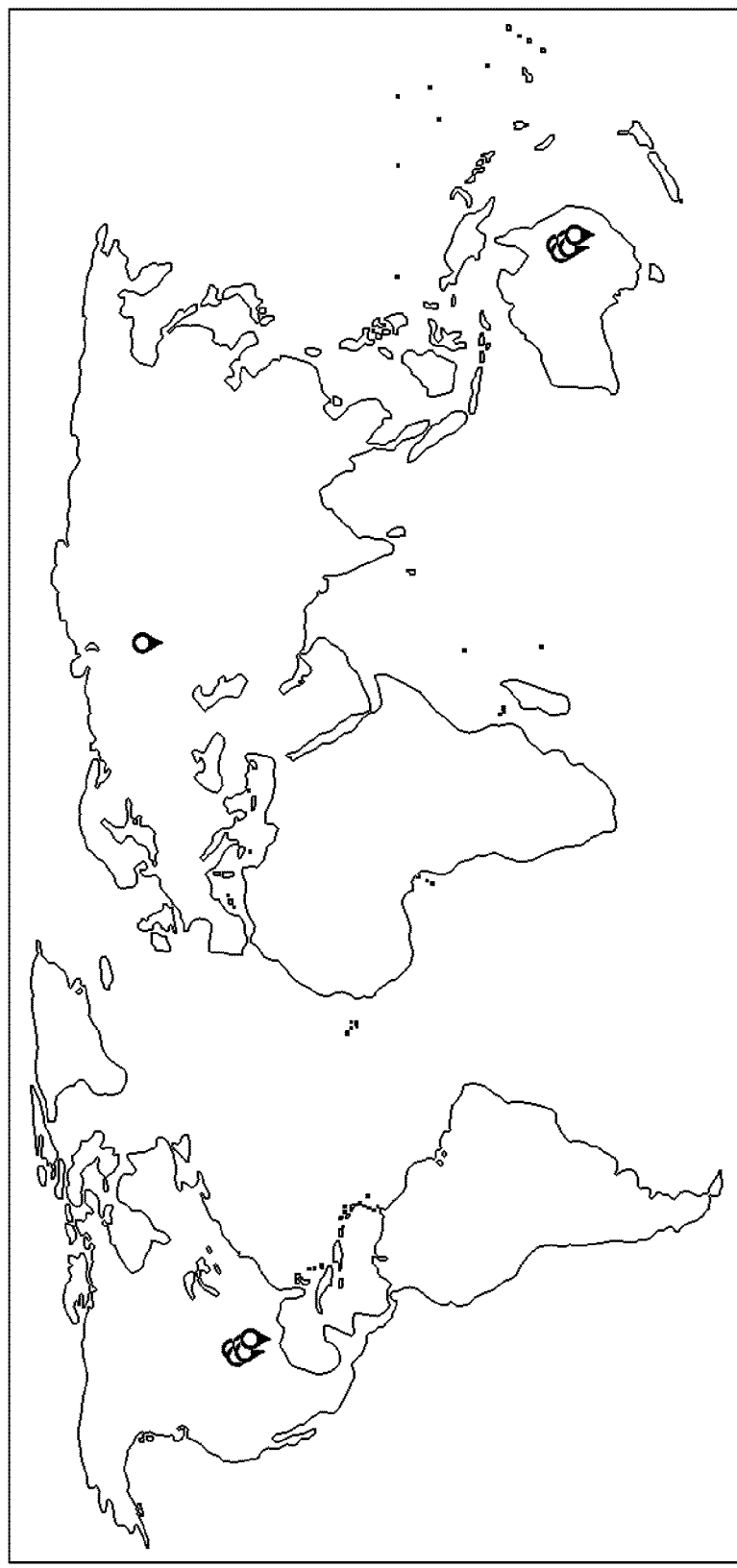

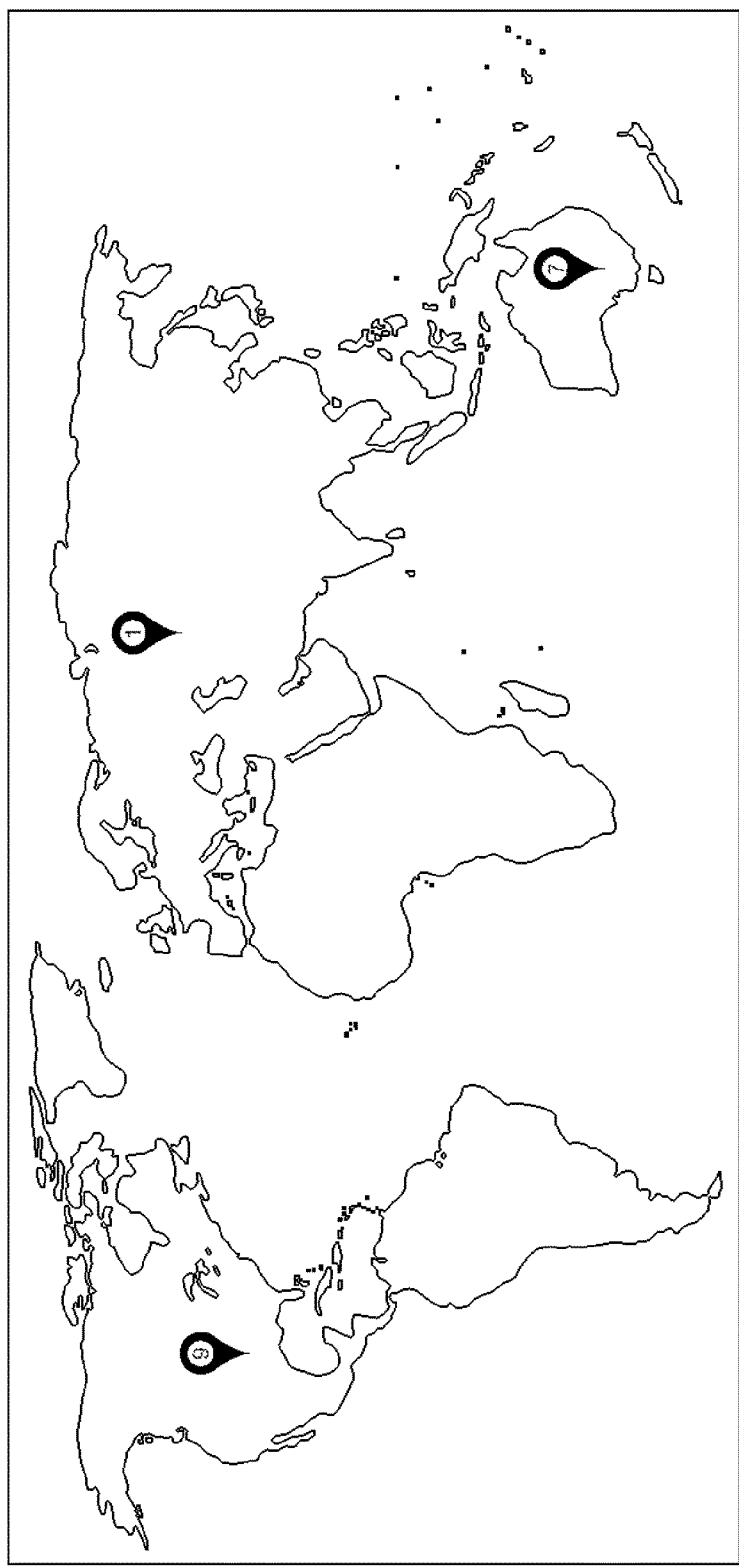

METHOD, DEVICE, AND SYSTEM OF GENERATING FRAUD-ALERTS FOR CYBER-ATTACKS

CROSS-REFERENCE TO RELATED APPLICATIONS

This application claims priority and benefit from U.S. provisional patent application No. 61/973,855, titled "Method, Device, and System of Detecting Identity of a User of an Electronic Service", filed on Apr. 2, 2014, which is hereby incorporated by reference in its entirety.

This application is a Continuation-in-Part (CIP) of, and claims priority and benefit from, U.S. patent application Ser. No. 14/566,723, filed on Dec. 11, 2014; which is a Continuation of U.S. patent application Ser. No. 13/922,271, filed on Jun. 20, 2013, now U.S. Pat. No. 8,938,787; which is a Continuation-in-Part (CIP) of U.S. patent application Ser. No. 13/877,676, filed on Apr. 4, 2013; which is a National Stage of PCT International Application number PCT/IL2011/000907, having an International Filing Date of Nov. 29, 2011; which claims priority and benefit from U.S. provisional patent application No. 61/417,479, filed on Nov. 29, 2010; all of which are hereby incorporated by reference in their entirety.

This application is a Continuation-in-Part (CIP) of, and claims priority and benefit from, U.S. patent application Ser. No. 14/320,653, filed on Jul. 1, 2014; which claims priority and benefit from U.S. provisional patent application No. 61/843,915, filed on Jul. 9, 2013; all of which are hereby incorporated by reference in their entirety.

This application is a Continuation-in-Part (CIP) of, and claims priority and benefit from, U.S. patent application Ser. No. 14/320,656, filed on Jul. 1, 2014; which claims priority and benefit from U.S. provisional patent application No. 61/843,915, filed on Jul. 9, 2013; all of which are hereby incorporated by reference in their entirety.

This application is a Continuation-in-Part (CIP) of, and claims priority and benefit from, U.S. patent application Ser. No. 14/325,393, filed on Jul. 8, 2014; which claims priority and benefit from U.S. provisional patent application No. 61/843,915, filed on Jul. 9, 2013; all of which are hereby incorporated by reference in their entirety.

This application is a Continuation-in-Part (CIP) of, and claims priority and benefit from, U.S. patent application Ser. No. 14/325,394, filed on Jul. 8, 2014; which claims priority and benefit from U.S. provisional patent application No. 61/843,915, filed on Jul. 9, 2013; all of which are hereby incorporated by reference in their entirety.

This application is a Continuation-in-Part (CIP) of, and claims priority and benefit from, U.S. patent application Ser. No. 14/325,395, filed on Jul. 8, 2014; which claims priority and benefit from U.S. provisional patent application No. 61/843,915, filed on Jul. 9, 2013; all of which are hereby incorporated by reference in their entirety.

This application is a Continuation-in-Part (CIP) of, and claims priority and benefit from, U.S. patent application Ser. No. 14/325,396, filed on Jul. 8, 2014; which claims priority and benefit from U.S. provisional patent application No. 61/843,915, filed on Jul. 9, 2013; all of which are hereby incorporated by reference in their entirety.

This application is a Continuation-in-Part (CIP) of, and claims priority and benefit from, U.S. patent application Ser. No. 14/325,397, filed on Jul. 8, 2014; which claims priority and benefit from U.S. provisional patent application No. 61/843,915, filed on Jul. 9, 2013; all of which are hereby incorporated by reference in their entirety.

This application is a Continuation-in-Part (CIP) of, and claims priority and benefit from, U.S. patent application Ser. No. 14/325,398, filed on Jul. 8, 2014; which claims priority and benefit from U.S. provisional patent application No. 61/843,915, filed on Jul. 9, 2013; all of which are hereby incorporated by reference in their entirety.

FIELD

The present invention is related to the security of electronic devices and systems.

BACKGROUND

Millions of people utilize mobile and non-mobile electronic devices, such as smartphones, tablets, laptop computers and desktop computers, in order to perform various activities. Such activities may include, for example, browsing the Internet, sending and receiving electronic mail (email) messages, taking photographs and videos, engaging in a video conference or a chat session, playing games, or the like.

Some activities may be privileged, or may require authentication of the user in order to ensure that only an authorized user engages in the activity. For example, a user may be required to enter a username and a password in order to access an email account, or in order to access an online banking interface or website.

SUMMARY

The present invention may include, for example, systems, devices, and methods for detecting identity of a user of an electronic device; for determining whether or not an electronic device is being used by a fraudulent user or by a legitimate user; and/or for differentiating among users of a computerized service or among users of an electronic device.

Some embodiments of the present invention may comprise devices, systems, and methods of detecting user identity, differentiating between users of a computerized service, and detecting a possible attacker.

The present invention may provide other and/or additional benefits or advantages.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements or components. The figures are listed below.

FIG. 3D is a schematic illustration of a map representation, in accordance with some embodiments of the present invention;

FIG. 3E is a schematic illustration of another map representation, in accordance with some embodiments of the present invention.

DETAILED DESCRIPTION OF THE PRESENT INVENTION

Figure 1:
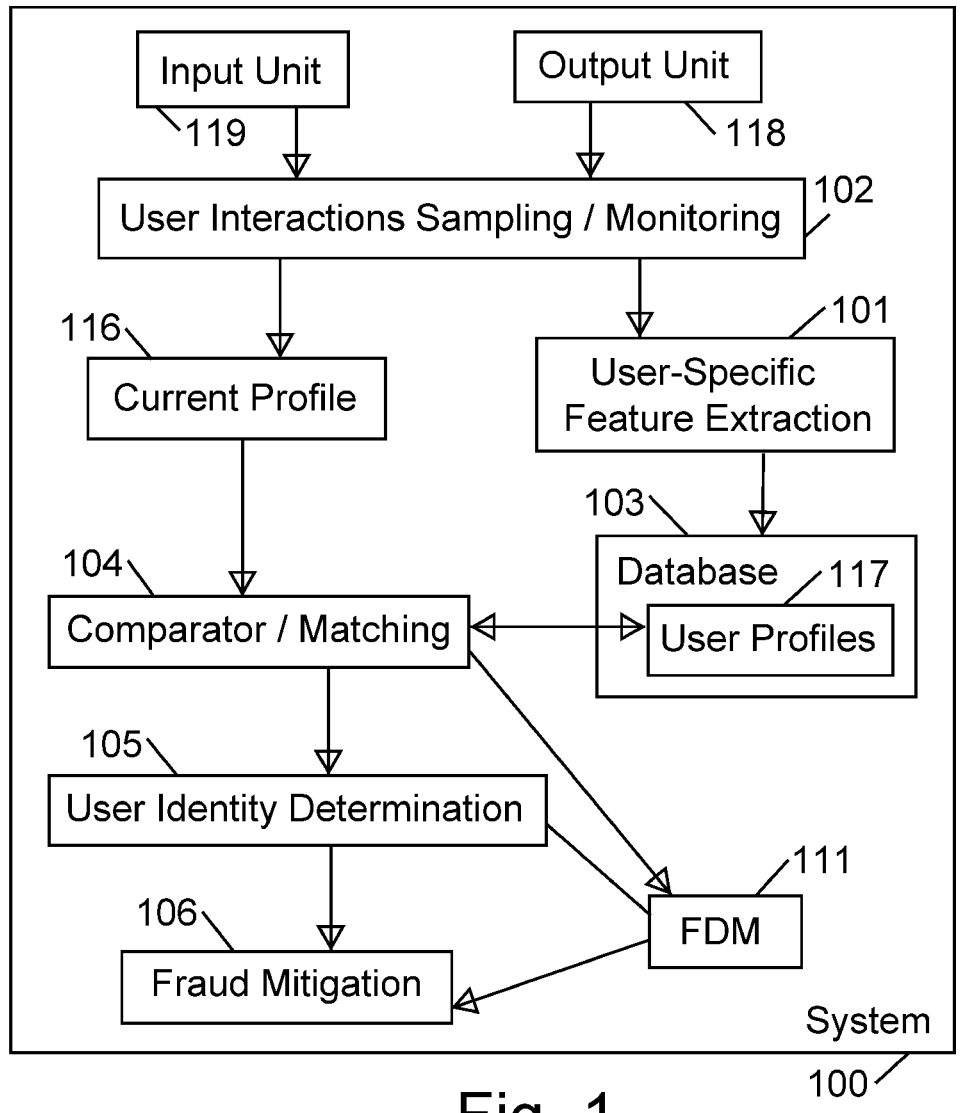
FIG. 1 is a schematic block-diagram illustration of a system, in accordance with some demonstrative embodiments of the present invention.

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Some embodiments may generate and provide a visualization tool, such as an investigator console visualizer, enabling an analyst or investigator to visualize hacking operations, fraudulent operations and/or security attacks or cyber-attacks.

Applicants have realized that the IT department or the security department of some corporate entities (e.g., banking institutions, credit card companies) may be interested in obtaining visualized and/or summarized and/or graphical data about hacking attempts and attacks, in addition to receiving alerts or alarms about such hacking attempts and attacks.

Applicants have realized that such visualization tool may allow the organization to enrich its knowledge about the modus operandi of attackers, and may allow to define manual rules and/or automated rules for handling similar situations or attacks, based on analysis of past attacks and hacking attempts.

Applicants have realized that current tools may not be able to store, provide and/or replay behavioral components or behavioral elements of an attack or a hacking attempt, during the hacking session and/or subsequent to the hacking session; and may not be able to show to the organization the exact behavior of the attacker, and may not allow the organization to research the particular modus operandi of the attacker.

Applicants have realized that in conventional systems, a fraud investigator or a fraud-department team-member may be required to manually review or examine, or sift through, numerous textual records or rows-of-data, spreadsheets, and possibly hundreds or thousands of lines (or pages) relating to user-interactions; thereby investing a significant amount of time in a time-consuming and error-prone task.

Applicants have realized that there lacks an efficient visualized tool that may save hundreds of man-hours of manual sifting through large amounts of fraud-related data that may be accumulated in a banking system, a brokerage system, or in a "cloud computing" repository or other "big data" repository or system.

The system of the present invention comprise a visualization module, able to expose and visualize behavioral elements and/or behavioral patterns that may characterize a particular attack or a series or batch or groups of cyber-attacks; taking into account behavioral and/or biometric characteristics of such attacker(s), and/or taking into accounts the varying behavioral and/or biometric characteristics that may differ among legitimate users versus attackers, under one or more modifiable contexts or conditions. The system may enable real-time analysis (or, retrospective analysis or review) of such cyber-attacks and hacking attempts or other fraud incidents; as well as after-the-fact or retrospective analysis thereof, by using the visualization tool or console or module.

Reference is made to FIG. 1, which is a schematic block-diagram illustration of a system 100 in accordance with some demonstrative embodiments of the present invention. System 100 may comprise, for example, an input unit 119, an output unit 118, a user interactions sampling/monitoring module 102, a user-specific feature extraction module 101, a database 103 to store user profiles 117, an ad-hoc or current user profile 116, a comparator/matching module 104, a user identity determination module 105, a Fraud Detection Module (FDM) 111, and a fraud mitigation module 106.

System 100 may monitor interactions of a user with a computerized service, for example, user interactions performed via an input unit 119 (e.g., mouse, keyboard, stylus, touch-screen) and an output unit 118 (e.g., monitor, screen, touch-screen) that the user utilizes for such interactions at the user's computing device (e.g., smartphone, tablet, laptop computer, desktop computer, or other electronic device). For example, a user interactions monitoring/sampling module 102 may monitor all user interactions via the input unit 119 and/or the output unit 118; and may record, log, track, capture, or otherwise sample such user interactions; and/or may otherwise collect user interaction data.

In a demonstrative implementation, for example, an end-user may utilize a computing device or an electronic device in order to launch a Web browser and browse to a website or web-based application of a computerized service (e.g., a banking website, a brokerage website, an online merchant, an electronic commerce website). The web-server of the computerized service may serve code, for example HTML code, that the Web browser of the end-user device may parse and may display and/or execute. In accordance with the present invention, for example, a JavaScript code or code-portion may be served to the Web-browser of the end-user device; or may otherwise be "called from" or loaded from an HTML page that is served to the end-user device. The JavaScript code may operate as a "silent key-logger" module, and may monitor an track and log all the user interactions via keyboard, mouse, touch-screen, and/or other input units, as well as their timing; and may write or upload or send such information to the web-server or to a third-party server in which the user interactions monitoring/sampling module 102 may reside. In some embodiments, such "silent key-logger" may be implemented such that it logs or records or stores or uploads to the server, or analyzes, only anonymous data, or only data that excludes the actual content of user interactions, or only data that on its own does not enable identification of the user or of the content that the user types; e.g., by logging or storing only the data-entry rate or timing, or the key-presses rate or timing, and while not storing (or while discarding) the actual key-presses or content types; for example, logging and storing that the user typed eight characters in two seconds, rather than logging and typing that the user types the word "Jonathan" in two seconds. The data describing the user interactions may be sent or uploaded, for example, every pre-defined time interval (e.g., every second, or every 3 or 5 or 10 seconds), or once a buffer of interactions is filled (e.g., once 20 keystrokes are logged; once 6 mouse-clicks are logged). Other suitable methods may be used to monitor and log user interactions.

The user interaction data may enable a user-specific feature extraction module 101 to extract or estimate or determine or calculate user-specific features that characterize the interaction and which are unique to the user (or, which are probably unique to the user). The user-specific feature extraction module 101 may store in a database 103 multiple user profiles 117, corresponding to various users of the computerized service. A user may have a single stored profile 117; or a user may have multiple stored profiles 117 that correspond to multiple usage sessions of that user (e.g., across multiple days; or across multiple usage sessions that begin with a log-in and end with a log-out or a time-out).

Once a user accesses (or attempts to access) the computerized service, and/or during the access of the user to the computerized service, the user interaction monitoring/sampling module 102 may monitor or sample the current user interactions; and the user-specific feature extraction module 101 may optionally create a current or ad-hoc user profile 116 that characterizes the user-specific features that are currently exhibited in the current session of user interactions.

A comparator/matching module 104 may compare or match, between: (i) values of user-specific features that are extracted in a current user session (or user interaction), and (ii) values of respective previously-captured or previously-extracted user-specific features (of the current user, and/or of other users, and/or of pre-defined sets of values that correspond to known automated scripts or "bots"). In some implementations, the comparator/matching module 104 may compare between the current ad-hoc user profile 116, and one or more previously-stored user profiles 117 that are stored in the database 103.

If the comparator/matching module 104 determines that one or more features, or a set of features, that characterize the current interaction session of the current user, does not match those features as extracted in previous interaction session(s) of that user, then, a possible-fraud signal may be generated and may be sent or transmitted to other modules of the system 100 and/or to particular recipients.

Additionally or alternatively, the comparator/matching module 104 may compare the features characterizing the current session of the current user, to features characterizing known automatic fraudulent mechanisms, known as malware or "bot" mechanisms, or other pre-defined data, in order to determine that, possibly or certainly, the current user is actually a non-genuine user and/or is accessing the service via a fraudulent mechanism.

In some embodiments, the comparator/matching module 104 may comprise, or may operate in association with, a Fraud Detection Module (FDM) 111, which may comprise (or may be implemented as) one or more sub-modules, as described herein.

In some embodiments, the output of the comparator/matching module 104 may be taken into account in combination with other information that the fraud detection module 111 may determine to be relevant or pertinent, for example, security information, user information, metadata, session data, risk factors, or other indicators (e.g., the IP address of the user; whether or not the user is attempting to perform a high-risk activity such as a wire transfer; whether or not the user is attempting to perform a new type of activity that this user did not perform in the past at all, or did not perform in the past 1 or 3 or 6 or 12 months or other time-period; or the like).

The combined factors and data may be taken into account by a user identity determination module 105, which may determine whether or not the current user is a fraudster or is possibly a fraudster. The user identity determination module 105 may trigger or activate a fraud mitigation module 106 able to perform one or more fraud mitigating steps based on that determination; for example, by requiring the current user to respond to a challenge, to answer security question(s), to contact customer service by phone, to perform a two-step authentication or two-factor authentication, or the like.

System 100 may be implemented by using suitable hardware components and/or software modules, which may be co-located or may be distributed over multiple locations or multiple devices. Components and/or modules of system 100 may interact or communicate over one or more wireless communication links, wired communication links, cellular communication, client/server architecture, peer-to-peer architecture, or the like.

Figure 2:
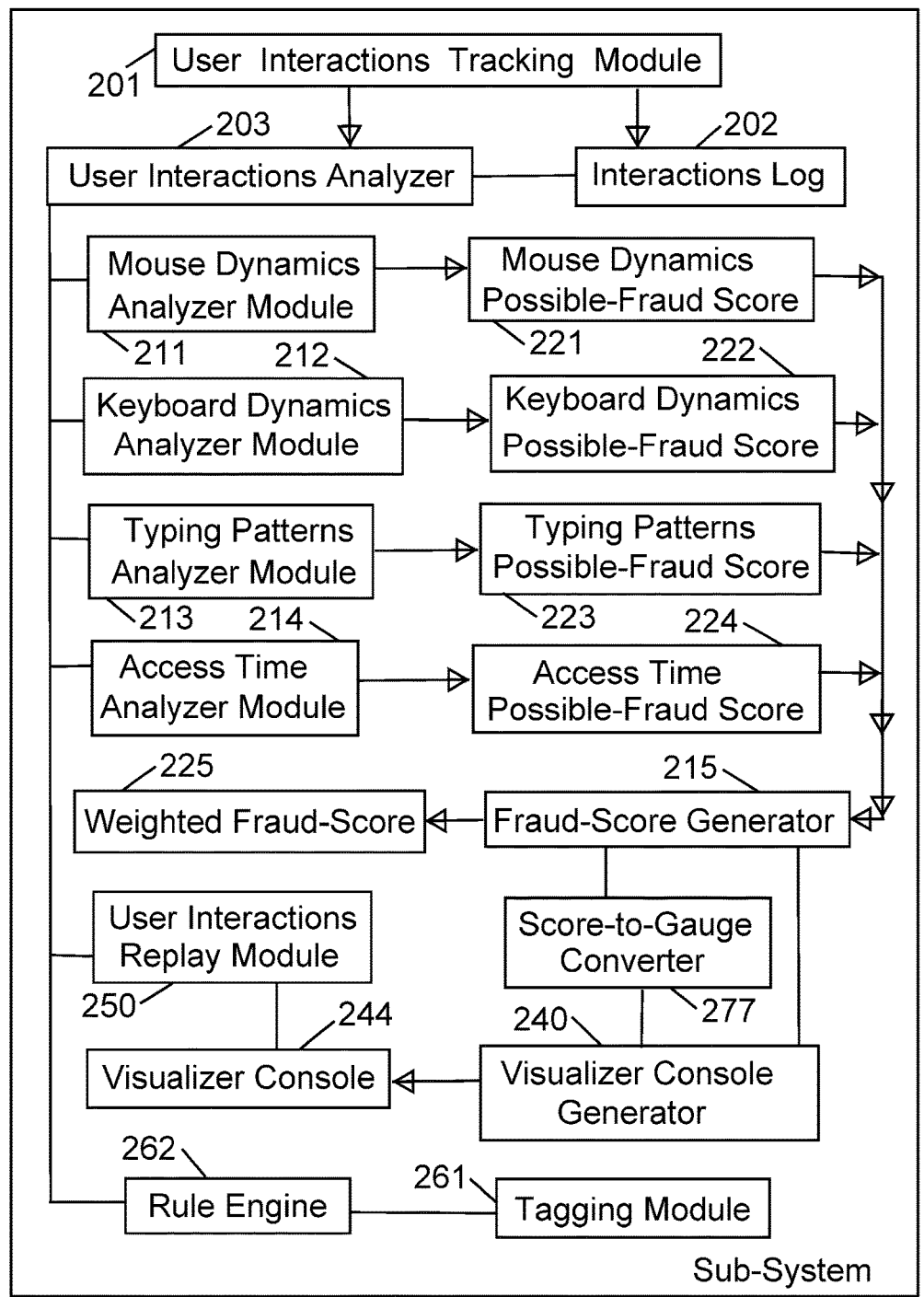
FIG. 2 is a schematic block-diagram illustration of a fraud detection sub-system, in accordance with some demonstrative embodiments of the present invention.

Reference is made to FIG. 2, which is a schematic block-diagram illustration of a fraud detection sub-system 200 in accordance with some demonstrative embodiments of the present invention. Sub-system 200 may operate to detect or to estimate, for example: fraud, fraud attempts, fraudulent computerized operations, unauthorized computerized operations, computerized operations that breach or violate a law or a regulation or policy or terms-of-use or an intended use of a service or website or application, or fraudulent activity.

Sub-system 200 may further operate to distinguish or differentiate among users (or to detect fraud) based on classification of features and their dependency on particular hardware and/or software being used by the end-user. Sub-system 200 may be implemented as part of, or as a sub-module of, the fraud detection module 111 of FIG. 1, the system 100 of FIG. 1, and/or other suitable systems or modules.

Sub-system 200 may comprise a user interaction tracking module 201, which may track the user interactions (e.g., keyboard presses, mouse-clicks, mouse-movements, touch-screen taps, and/or other user gestures) when the user interacts with a computerized service via an electronic device (e.g., desktop computer, laptop computer, tablet, smartphone, or the like). The user interaction tracking module 201 may observe and/or record and/or log all such user interactions, and may optionally store them in an interactions log 202 or other database or repository.

A user interactions analyzer 203 may review the tracked user interaction, in real time, or substantially in real time (e.g., within one second or within three seconds of the occurrence or completion of an interaction), or at pre-defined time intervals (e.g., every ten seconds, every 60 seconds), or at pre-defined triggering events (e.g., upon clicking of a "submit" button or a "confirm" button of an online form), or in retrospect (e.g., once a day in retrospect for all the daily interactions that reflect transactions that are in a pipeline for review prior to execution; or as part of a post-action audit process or crime investigation process). The user interactions analyzer 203 may look for a particular user interaction, or for a set or sequence or group or batch of consecutive user interactions, or for a set or sequence or group or batch of non-consecutive user interactions, that are pre-defined in the system as indicative of possible fraud activity (or alternatively, as pre-defined in the system as indicative of legitimate non-fraudulent activity).

In a demonstrative implementation, a mouse dynamics analyzer module 211 may analyze the mouse-related user interactions to detect or determine user interactions that may indicate, taken individually by themselves (or taken in combination with other interactions or with other data) that the current user is a cyber-attacker (or conversely, that the current user is an authorized user). For example, the mouse dynamics analyzer module 211 may detect that the rate or speed of mouse-clicks indicates a highly-experienced user which may be an experienced hacker; or that the lack of manual correction of mouse-movement, in response to an injected interference of deviating the mouse-pointer during its on-screen travel route, indicates an automated script or a cyber-attack "bot" or malware rather than an authorized human user. Accordingly, the mouse dynamics analyzer module 211 may generate a mouse dynamics possible-fraud score 221; for example, on a scale of 0 to 100, or on a scale of 0 to 1,000, or using other suitable scale.

Similarly, a keyboard dynamics analyzer module 212 may analyze the keyboard-related user interactions to detect or determine user interactions that may indicate, taken individually by themselves (or taken in combination with other interactions or with other data) that the current user is a cyber-attacker (or conversely, that the current user is an authorized user). For example, the keyboard dynamics analyzer module 212 may detect that the rate or speed of data-entry via keyboard indicates a highly-experienced user which may be an experienced hacker; or may detect a high-rate or excessive-usage of rapid copy-and-paste operations when filling-out data in online forms, thereby indicating a possible cyber-attacker who copies-and-pastes data from a prepared sheet with victim details; or the like. Accordingly, the keyboard dynamics analyzer module 212 may generate a keyboard dynamics possible-fraud score 222; for example, on a scale of 0 to 100, or on a scale of 0 to 1,000, or using other suitable scale.

Similarly, a typing patterns analyzer module 213 may analyze the data-entry related user interactions to detect or determine user interactions that may indicate, taken individually by themselves (or taken in combination with other interactions or with other data) that the current user is a cyber-attacker (or conversely, that the current user is an authorized user). For example, the typing patterns analyzer module 213 may detect that the data-entry or typing speed or rate seems to indicate that the user is a highly-experienced attacker; or that the lack of deletion operations in sophisticated fields (such as beneficiary name or beneficiary account number) indicates that the user is a cyber-attacker who copies data carefully and without mistakes, in contrast with an authorized user who may typically make mistakes in typing and then correct them; or that the user performed deletion operations in fields that an authorized user typically does not make mistakes in (such as, username field, password field, first-name field, last-name field), or the like. Accordingly, the typing patterns analyzer module 213 may generate a typing patterns possible-fraud score 223; for example, on a scale of 0 to 100, or on a scale of 0 to 1,000, or using other suitable scale.

Similarly, an access time analyzer module 214 may analyze time-related or timing-related aspects of data-entry or other user interactions to detect or determine user interactions that may indicate, taken individually by themselves (or taken in combination with other interactions or with other data) that the current user is a cyber-attacker (or conversely, that the current user is an authorized user). For example, a significantly short time spent on filling-out of multiple complicated fields in an online form, may indicate that the user is actually a cyber-attacker who copies the data from a prepared list of victim data; particularly if this is the first time that the currently-examined account (e.g., bank account) is performing such operation or transaction. Other time-related or timing-related data may trigger a possible fraud indication; for example, excessive log-in attempts or excessive logged-in sessions; utilization of the computerized service during a time in which the user is expected to be sleeping or less available (e.g., at 3:30 AM local time of the account owner); or the like. The access time analyzer module 214 may detect that the time-related or timing-related insights seem to indicate that the user is a highly-experienced attacker. Accordingly, the access time analyzer module 214 may generate an access time possible-fraud score 224; for example, on a scale of 0 to 100, or on a scale of 0 to 1,000, or using other suitable scale.

A fraud-score generator 215 may generate a fraud-score or a weighted fraud-score 225, based on the generated scores 221-224. For example, an average or median sore may be generated, based on the generated scores 221-224 or based on some of them. In some embodiments, each one of the generated scores 221-224 may be associated (e.g., using a lookup table or other weighting parameter) with a weight or relative-weight, and a weighted score or weighted average may be generated by the fraud-score generator 215.

A fraud investigator visualizer console generator 240 may generate a fraud investigator visualizer console 244 comprising one or more visual representations, graphical representation, or other on-screen representations, which may efficiently and concisely indicate to the investigator or the researcher one or more of the generated scores 221-225. For example, each one of scores 221-225 may be displayed as a gauge, a circular gauge, a partially-circular gauge, a slider, a spectrum, a linear spectrum, a pie chart, a graph, or other suitable graphical representation.

Optionally, a score-to-gauge converter 277 (or other gauge generator, or GUI element generator) may be used in order to generate a suitable graphic illustration depicting a gauge, a needle, and a pointing of the needle towards the suitable location or region of the gauge. For example, a gauge-frame may be generated as a partial-circle (e.g., comprising approximately 80% of an entire circular ring or circle); a left-side corner or end or edge may be defined as a lower-limit (e.g., value of zero); a right-side corner or end or edge may be defined as an upper-limit (e.g., value of 100 or 1000); and the length of the curved ring in between the two edges, may correspond to the entire numerical range. The needle may be drawn to point to the suitable numerical value; for example, if the entire range is from 0 to 100, and the current score-value is 40, then the needle may be drawn to point towards a particular location along the ring which is located 2/5 away from the left-side corner and is located 3/5 away from the right-side corner. Other suitable methods may be used.

In some embodiments, a user interactions replay module 250 may enable the fraud investigator to request a step-by-step replay, or slowed-down replay, or real-life-speed replay, or a summarized replay or a high-speed replay, of the actual user interaction of the particular user or account being reviewed or investigates. For example, the user interactions replay module 250 may present the actual screen or form that the user had used; and may emulate or simulate on such displayed screen or form, the actual mouse-movement and/or typing that the user had performed, at their exact timing and rate and speed and locations, as previously logged and recorded in the interactions log 202. This may enable the fraud investigator to actually see and visualize in a direct manner, without machine interpretations, the actual incident or fraud-incident that is being reviewed or investigated. Some embodiments of the present invention may thus enable full visualization of the cyber-attack or the investigated incident, as if a "security camera" had been located behind the shoulders of the cyber-attacker during the attack and recorded or captured the screen and the user interactions for subsequent replay.

Figure 3A:
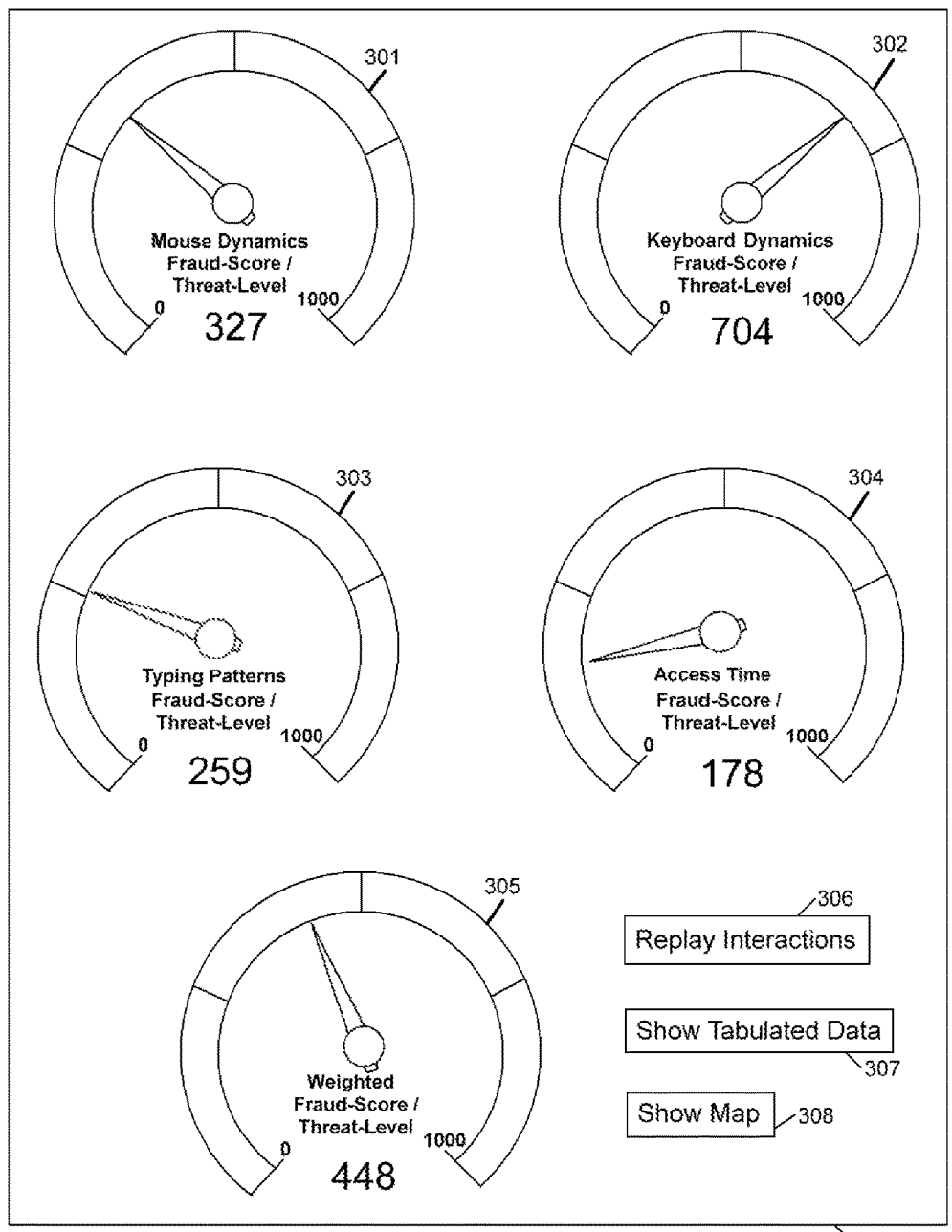
FIG. 3A is a schematic illustration of a computerized user interface, in accordance with some demonstrative embodiments of the present invention.

Reference is made to FIG. 3A, which is a schematic illustration of a computerized interface 300, in accordance with some demonstrative embodiments of the present invention. Interface 300 may be or may comprise, for example, a fraud investigator or fraud researcher Visualization Console.

Interface 300 may comprise one or more gauges, or other GUI elements or graphical elements, in order to efficiently visualize or efficiently represent a summarized version of the insights deduced from examining a significant number of user interactions. For example, a gauge 301 may indicate the fraud-score associated with monitored mouse dynamics; a gauge 302 may indicate the fraud-score associated with monitored keyboard dynamics; a gauge 303 may indicate the fraud-score associated with monitored typing patterns; a gauge 304 may indicate the fraud-score associated with monitored access time or other timing-related data; other suitable gauges or GUI elements may be used, to visualize or represent other suitable fraud-related parameters or summarized data.

Additionally or alternatively, a gauge 305 may indicate the (weighted) fraud-score calculated or generated based on the other discrete scores, and/or based on other parameters that the system may be aware of (e.g., taking into account the gender of the user; the age or age-range of the user; the country or location in which the user resides; the country or the location from which the user logged-in or accessed the computerized service; or the like).

Each one of gauge(s) 301-305 may optionally display the name or label of the fraud-related parameter or score that is indicate by the gauge; as well as the "needle" of the gauge pointing towards the relative point or region on such gauge. Optionally, the actual score or numerical-value may be presented within or near each such gauge 301-305. Optionally, small lines or indicators may divide each gauge 301-305 into regions, to facilitate the quick understanding of the location to which the needle is pointing. Optionally, the end-values (such as 0 and 100; or such as 0 and 1,000) may be displayed at or near the gauge, to remind the viewer of the value-limits of each gauge 301-305.

Optionally, a "Replay Interactions" button 306 (or other user interface element) may allow the fraud investigator to command the system to play-back an animation or a video showing an emulation of the actual user interactions that were performed by the user, as recorded and logged in the interactions log. Optionally, the replay may be associated with other GUI elements, for example, enabling the fraud investigator to pause the animation, to rewind, to fast-forward, to loop a portion of the animation, to stop the animation, to increase or decrease the playback speed, to zoom-in or zoom-out, to extract data or capture screen-shots or export data from the replayed animation, or the like.

For purposes of clarity, gauges 301-305 are shown as black-and-white wire-frame GUI elements. However, in some embodiments, gauges 301-305 (or other GUI elements) may utilize multiple colors in order to more efficiently convey the pertinent information to a fraud investigator.

Figure 3B:
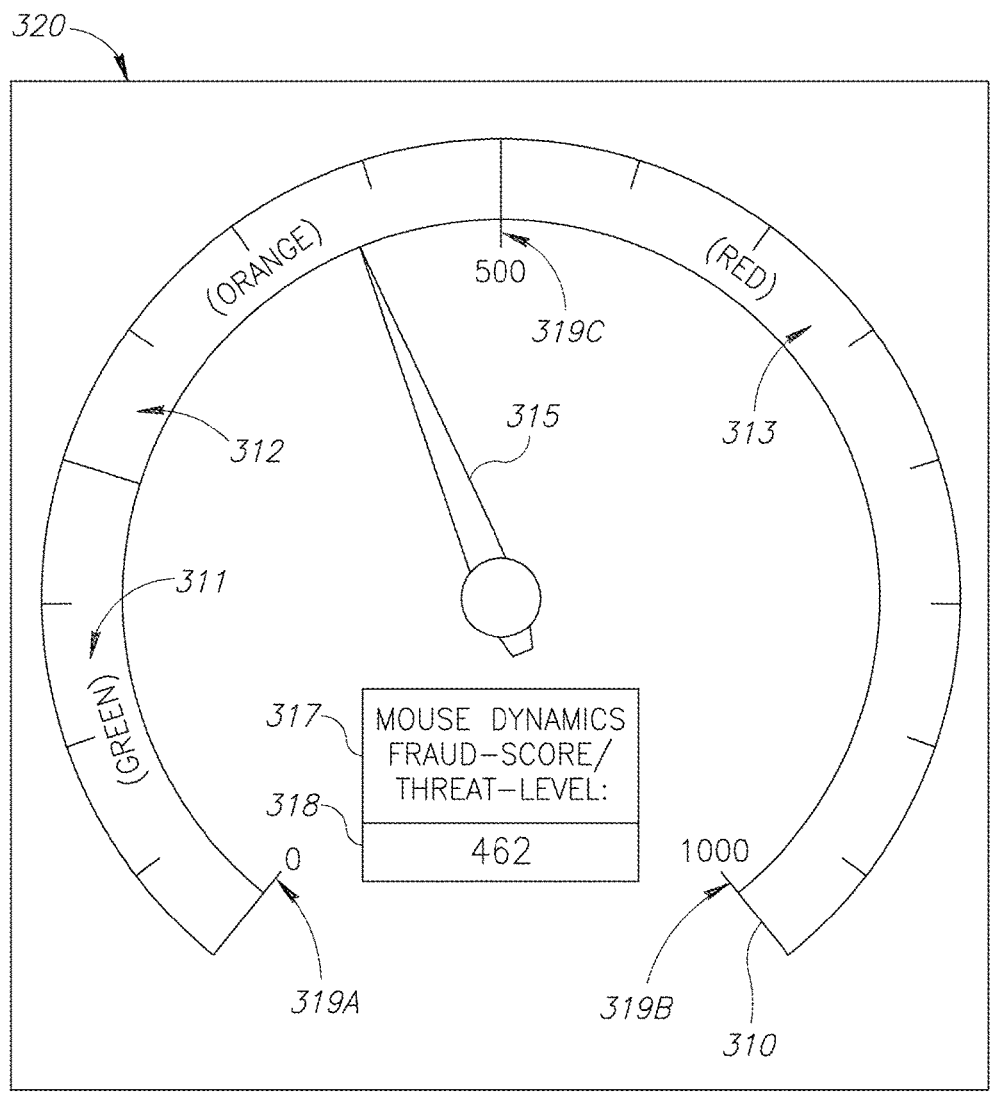
FIG. 3B is a schematic illustration of a computerized display having an on-screen fraud-detection gauge or cyber-fraud threat-level gauge, in accordance with some demonstrative embodiments of the present invention.

Reference is made to FIG. 3B, which is a schematic illustration of a computerized display 320 having an on-screen fraud-detection gauge 310 (or cyber-fraud threat-level gauge), in accordance with some demonstrative embodiments of the present invention. Gauge 310 may comprise a needle 315 and multiple regions, which may optionally be color-coded; for example: (A) a first region or "green region" or low fraud-risk region 311, such that when the needle 315 points to a value in the green region, low fraud-risk is indicated; (B) a second region or "orange region" or medium fraud-risk region 312, such that when the needle 315 points to a value in the yellow region, medium fraud-risk is indicated; (C) a third region or "red region" or high fraud-risk region 313, such that when the needle 315 points to a value in the red region, high fraud-risk is indicated. The regions need not have the same size or dimensions; for example, the high fraud-risk region 313 may be larger, or significantly larger (e.g., 1.5 larger or 2.0 larger) in size relative to region 312 or relative to region 311.

A textual or graphical label 317 may indicate which type of fraud-score or threat-level (e.g., mouse dynamics related) is represented by this gauge 310. A textual or numeric label 318 may indicate the numeric value of the fraud-score or threat-level (e.g., value of 462 on a scale of 0 to 1,000). Optionally, a lowest-limit indicator 319A may indicate the lowest-limit value (e.g., zero) of the range represented by the gauge circumference; an upper-limit indicator 319B may indicate the upper-limit value (e.g., 1,000) of that range; and one or more other indications, such as indication 319C, may indicate other locations-of-interest along that range (e.g., indication 319C demonstrating the half-way value of 500 in that range).

Figure 3C:
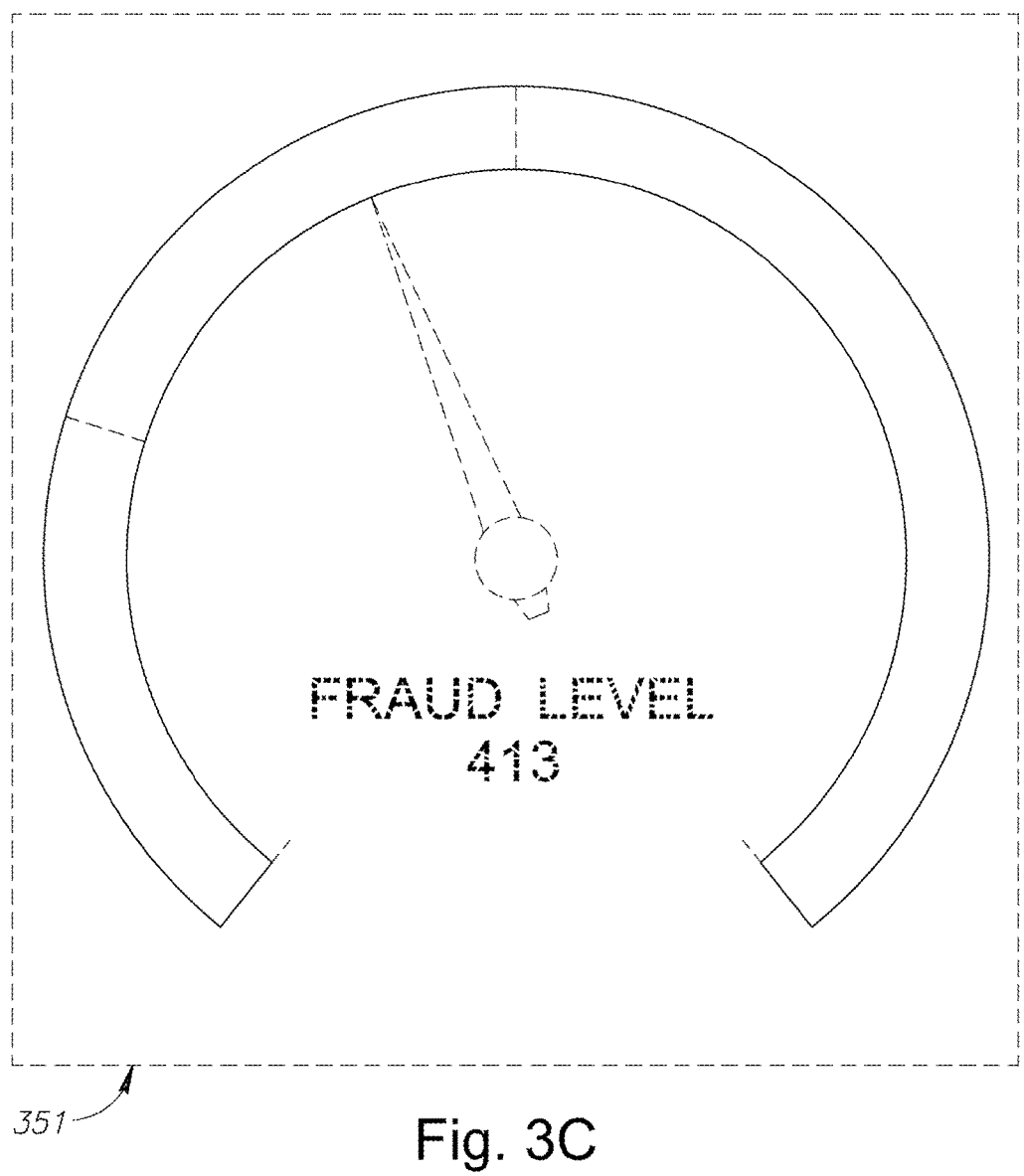
FIG. 3C is a schematic illustration of a computerized display having an on-screen fraud-detection gauge (or cyber-fraud threat-level gauge), in accordance with some demonstrative embodiments of the present invention.

Reference is also made to FIG. 3C, which is a schematic illustration of a computerized display 351 having an on-screen fraud-detection gauge (or cyber-fraud threat-level gauge), in accordance with some demonstrative embodiments of the present invention.

Referring again to FIG. 3A, optionally, a "Show Tabulated Data" button 307 may be displayed, enabling the fraud investigator to command the system to present or export or output additional data; for example, arranged in a table format or as spreadsheet, pertaining to the statistics of user interactions of the current usage session being investigated, compared with the general population of users, and/or compared with overall previous usage sessions of this particular user whose account is being investigated or reviewed.

In a demonstrative implementation, the tabulated (or otherwise formatted or structured) data may be generated and displayed or exported in a format similar to Table 1:

TABLE 1

| | Capitalization of Text | | |
|---|---|---|---|
| Input Method Used | Number of Occurrences in Current Usage Session | % of Previous Usage Sessions of this Account | % over the General Population |
| Shift + Key | 2 | 0% | 12% |
| CAPS Lock | 5 | 100% | 68% |

In another demonstrative implementation, the tabulated (or otherwise formatted or structured) data may be generated and displayed or exported in a format similar to Table 2:

TABLE 2

Navigation among Fields within a Form

| Input Method Used | Number of Occurrences in Current Usage Session | % of Previous Usage Sessions of this Account | % over the General Population |
|---|---|---|---|
| Mouse + Click | 3 | 81% | 35% |
| Shift + Tab | 0 | 0% | 0% |
| Tab | 14 | 17% | 42% |

In another demonstrative implementation, the tabulated (or otherwise formatted or structured) data may be generated and displayed or exported in a format similar to Table 3:

TABLE 3

Deletion of Characters

| Input Method Used | Number of Occurrences in Current Usage Session | % of Previous Usage Sessions of this Account | % over the General Population |
|---|---|---|---|
| Sticky Backspace | 1 | 19% | 0% |
| Sticky Delete | 2 | 5% | 8% |
| Repeated Backspace | 0 | 93% | 74% |
| Repeated Delete | 0 | 96% | 61% |
| Select + Delete | 8 | 63% | 0% |
| Select + Backspace | 7 | 57% | 13% |

In another demonstrative implementation, the tabulated (or otherwise formatted or structured) data may be generated and displayed or exported in a format similar to Table 4:

TABLE 4

Form Submission

| Input Method Used | Number of Occurrences in Current Usage Session | % of Previous Usage Sessions of this Account | % over the General Population |
|---|---|---|---|
| Mouse Click | 9 | 77% | 0% |
| Enter key | 2 | 98% | 0% |
| Space bar | 5 | 16% | 48% |

In another demonstrative implementation, the tabulated (or otherwise formatted or structured) data may be generated and displayed or exported in a format similar to Table 5:

TABLE 5

Vertical Scrolling of Page/Form/Screen

| Input Method Used | Number of Occurrences in Current Usage Session | % of Previous Usage Sessions of this Account | % over the General Population |
|---|---|---|---|
| Sticky Arrow Key | 4 | 8% | 0% |
| Repeated Arrow Key | 12 | 82% | 12% |
| Page Down/Up Key | 0 | 42% | 24% |
| Mouse-Wheel Spin | 7 | 75% | 93% |

Other suitable tables or data-structures may be generated, based on the analysis of user interactions in the current usage session, in previous usage sessions of the account being reviewed, and/or in other usage sessions of other users (e.g., the general population of users, or a subset or group of such other users; for example, all the users who reside in a particular country or state; or all the users who performed a wire transfer).

Optionally, a "Show Map" button 308 may enable the fraud investigator to command the system to display or to export a map representation of the world or other geographical region (e.g., country; state; county; continent), with indications of the geo-locations from which usage sessions took place for the reviewed account.

For example, a map of the world may be shown; with a pin having the number "6" pointing at London, indicating that the user performed in the past six log-ins from London; and with another pin having the number "8" pointing at Miami, indicating that the user performed in the past eight log-ins from Miami; and with another pin showing in red color the number "1" indicating a single (e.g., current) usage session originating from Moscow.

For demonstrative purposes, FIG. 3D is a schematic illustration of a map representation 391 of Earth, in accordance with some embodiments of the present invention; showing multiple pins indicating multiple usage-sessions that accessed the presently-reviewed user-account from Central United States; further showing multiple pins indicating multiple usage-sessions that accessed the presently-reviewed user-account from Australia; and further showing a single pin indicating a single, isolated, usage-session that accessed the presently-reviewed user-account from Russia; thereby alerting the fraud investigator in an efficient and rapid manner to fraud possibility in the reviewed user account.

For demonstrative purposes, FIG. 3E is a schematic illustration of a map representation 392 of Earth, in accordance with some embodiments of the present invention; showing a single pin with the number "9" indicating nine usage-sessions that accessed the presently-reviewed user-account from Central United States; further showing a single pin with the number "7" indicating seven usage-sessions that accessed the presently-reviewed user-account from Australia; and further showing a single pin indicating the number "1" indicating a single, isolated, usage-session that accessed the presently-reviewed user-account from Russia; thereby alerting the fraud investigator in an efficient and rapid manner to fraud possibility in the reviewed user account. The system may aggregate or may group together, multiple pins or multiple geo-spatial locations, that are located within a pre-defined radius or distance from each other (or from a single pin among them), into a unified group that is represented by a single pin with a numeric value indicating the aggregate number of usage-sessions from that geographical area or vicinity or radius; thereby preventing an over-crowding of the map representations with dozens of overlapping pins, and thus facilitating and hastening the review by the fraud investigator. Other suitable maps, pins and/or indications may be calculated and presented.

Referring again to FIG. 2, some embodiments may enable the analyst or investigator to perform a step-by-step "replay" of the actions performed by the attacker or hacker (which may be recorded and stored as they are performed by the attacker); to locate and find other relevant data, such as past activity or past interactions of the same attacker; to filter or sort or modify the visualization based on one or more parameters; to perform link analysis; to perform "playback" of the input units (mouse, keyboard) as utilized by the attackers, while emphasizing or indicating particular traits of such utilization.

In some embodiments, the fraud researcher may utilize a tagging module 261 to tag or flag once a particular interaction as fraudulent or suspicious. Furthermore, a Rule Engine 262 may utilize machine learning in order to extrapolate or to subsequently identify, in real time, similar suspicious or fraudulent behaviors or interactions, which may then be used by the user interactions analyzer module 203 to generate or to trigger real-time alarms or alerts with regard thereto, in view of the rules generated by the Rule Engine 262.

In a demonstrative implementation, the system of the present invention may be utilized in order to investigate a fraudulent transaction or a suspicious wire transfer that was possibly performed by a hacker or attacker, as described herein.

Figure 4:
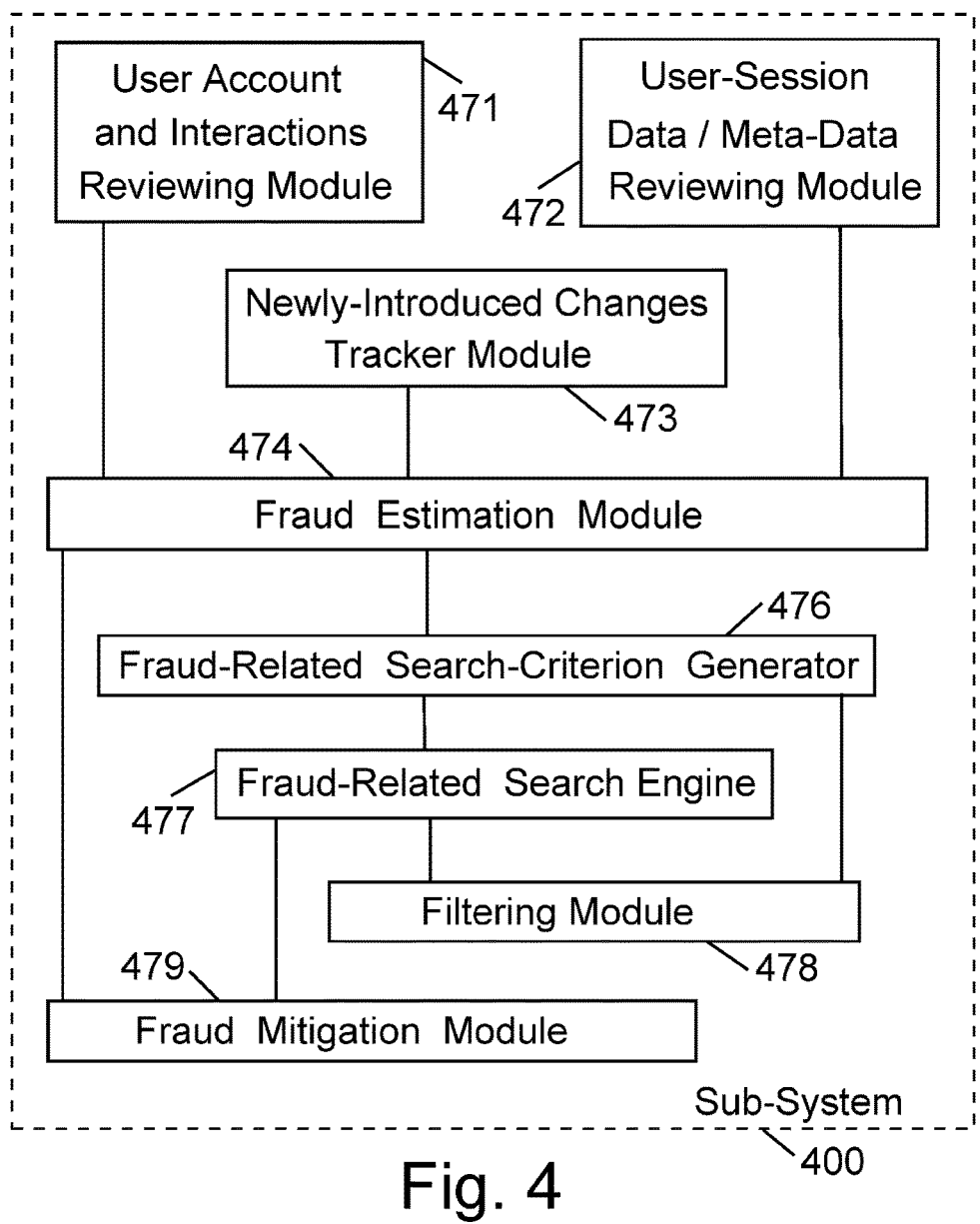
FIG. 4 is a schematic block-diagram illustration of another fraud detection sub-system, in accordance with some demonstrative embodiments of the present invention.

Reference is made to FIG. 4, which is a schematic block-diagram illustration of a fraud detection sub-system 400 in accordance with some demonstrative embodiments of the present invention. Sub-system 400 may be implemented as part of, or as a sub-module of, the fraud detection module 111 of FIG. 1, the system 100 of FIG. 1, and/or other suitable systems or modules.

In a demonstrative example, an analyst or investigator may utilize a User Account and Interactions Reviewing Module 471 in order to manually review and examine the past transactions of the user (or: of the account being reviewed), in the past 30 or 60 or 90 days; the analyst identifies a series of login sessions that were performed from a particular IP address located (for example) in Nevada, being a new IP address that was not used by this user in the past; but without yet identifying a suspicious activity in this series of login sessions.

Then, the analyst may utilize a User-Session Data/Metadata Reviewing Module 472 to review and discover that in the first login session from that new IP address, the logged-in user had examined some or all of the defined Beneficiaries (or payees), and performed a Copy operation of the beneficiaries' names, addresses, and/or past wire transfers data.

Then, the analyst may further recognize, using a Newly-Introduced Changes Tracker module 473 of the system of the present invention, that in the last or near-last login session from that new IP address, the user defined a new Beneficiary (or payee).

At this stage, a Fraud Estimation Module 474 may deduce that this series of login sessions and interactions were possibly performed by a hacker or cyber-attacker, in order to achieve one or more fraudulent goals, for example: (a) to make the banking system recognize the hacker as a "regular" non-harming user that simply logs-in from a new IP address without actually removing money from the account; and/or, (b) to allow the hacker to "learn" historic data about past wire transfers of the authorized user, in order to find or to add a suitable "mule" or destination that will allow the hacker to perform a wire transfer that will go through the bank wire system without triggering the banking system's transaction anomaly detector.

The fraud estimation module 474 may proceed to deduce, how to subsequently identify similar attackers and/or similar attacks in the future; and how to discover current transactions or series-of-transactions in which an attack is currently being carried out. For example, a fraud-related search criterion generator 476 may automatically generate a fraud-related search criterion or search query, and a fraud-related search engine 477 may utilize such criterion or query in order to search in the system for other users who logged-in from the flagged new IP address, but may not find adequate results. The system may proceed to search for all the users, who logged-in successfully in the past 30 or 60 days, from a new (firstly used) IP address that is located in Nevada; and this may yield a detailed list of results. It is noted that in some embodiments, the fraud-related search engine 477 may search or may analyze a "fraud file" or other file or data-structure, which may include data or raw-data or partially-analyzed data or suspicious-data or possibly-suspicious data, or data that was at least partially sorted or filtered (e.g., based on user account, or based on IP address of accessing user, or based on geo-location of user(s), or based on time-date stamps, and/or based on a combination of such parameters or other parameters); and such "fraud file" or fraud-data file may be parsed and searched by the fraud-related search engine 477 of the present invention, based on the fraud-related search criteria that the fraud-related criterion generator 476 may generate.

Then, a filtering module 478 may filter the fraud-related search results based on one or more filtering criteria; for example, by commanding to include only search results in which the user has performed a Copy operation; and the results list may shrink to only few results. Further inspection, or further filtering by the system, may show that some of the members of the short-list, have also added a new Beneficiary (or new Payee) in the past 30 days, thereby indicating a possible hacked account.

The system may then proceed to trigger a fraud mitigation module 479 to take the suitable measures; for example, to place a temporary "hold" or "freeze" on the account, or to place an automated (or manual) telephone call to the customer to authenticate recent transactions, or to send an email message and/or text message or other notification that requires the account owner to authenticate or to call the customer service.

Optionally, as a mitigation route, the system may automatically erase, or put on "hold", the newly-added Beneficiary in order to prevent a fraudulent wire transfer to it. Optionally, the account owner may be placed into a High Risk list of users, such that subsequent adding of beneficiaries or payees may require additional security measures (e.g., typing of an ATM pin, or telephonic authentication by the user).

In some embodiments, the system may automatically define a new fraud-detection rule which characterizes this pattern of operations or series of operations, thereby enabling further automated detection of similar fraudulent series of operations in similar instances.

Some embodiments may generate a detailed Report and/or a Visualization Console, as demonstrated in the drawings, which may demonstrate for example: session metadata; authentication activity scores (e.g., taking into account: mouse dynamics, keyboard dynamics, typing parameters, access time); session flow; previous sessions map; account behavioral patterns (e.g., capitalization; navigation between form fields; deletion methods; cut-copy-paste operations; selection methods; intra-field navigation; form submission method; numeric input method; scrolling method; special mouse events; other input-related events; specific pattern(s) identified for using particular data fields, such as account field, password field, moving between fields in the login form, submitting the login form, amount field, date field); threat score(s), abnormal behavior score(s), device and network risk scores, login's history (e.g., based on Internet Protocol (IP) address, WHOIS data for IP address, Web-browser used, Operating System (OS) used, screen size used, language used), device and network attributes, and/or other data; as well as interface allowing an analyst to provide comments and/or to classify the observed session (e.g., as confirmed fraud, as confirmed genuine, as suspicious, as non-classified yet); and an interface allowing "playback" of video or animation demonstrating the user session interactions, step by step.

The present invention may differentiate or distinguish between the genuine (human) user, and a robot or a machine-operable module or function (e.g., implemented as a computer virus, a Trojan module, a cyber-weapon, or other malware) which attempts to automatically imitate or emulate or simulate movement of a cursor or other interaction with a touch-screen. For example, false identity created by automated malware may be detected by the present invention as such automated malware may lack the characterization of human (e.g., the manual activity having the particular user-specific traits, as described above).

The present invention may operate and may provide an efficient biometric or user-authentication modality, without capturing, storing, or otherwise identifying any Personally Identifiable Information (PII). For example, the present invention may be used to distinguish between a genuine user and a fraudster, without knowing any PII of the genuine user and/or of the fraudster.

The present invention may detect correlations and extract user-specific traits based on passive data collection and/or based on active challenges. In passive data collection, the device may detect that the user is performing a particular operation (e.g., a vertical scroll gesture), and may further detect that performing this gesture affects in a user-specific way the acceleration and/or the orientation/rotation of the mobile device. In an active challenge, the device (or an application or process thereof) may actively present a challenge to the user, such as, a requirement to the user to perform horizontal scrolling, in order to capture data and detect user-specific correlation(s). The active challenge may be hidden or may be unknown to the user, for example, implemented by creating a Graphical User Interface (GUI) that requires the button to scroll in order to reach a "submit" button or a "next" button or a "continue" button, thereby "forcing" the user to unknowingly perform a particular user-gesture which may be useful for correlation detection or for extraction of user-specific traits, as described. Alternatively, the active challenge may be known to the user, and may be presented to the user as an additional security feature; for example, by requesting the user to drag and drop an on-screen object from a first point to a second point, as an action that may be taken into account for confirming user identity.

Some embodiments of the present invention may be implemented, for example, as a built-in or integrated security feature which may be a component or a module of a system or device, or may be a downloadable or install-able application or module, or plug-in or extension; or as a module of a web-site or web-page, or of a client-server system or a "cloud computing" system; or as machine-readable medium or article or memory unit able to store instructions and/or code which, when executed by the mobile device or by other suitable machine (e.g., a remote server, or a processor or a computer) cause such machine to perform the method(s) and/or operations described herein. Some units, components or modules, may be implemented externally to the user device, may be implemented in a remote server, a web server, a website or webpage, a "cloud computing" server or database, a client/server system, a distributed system, a peer-to-peer network or system, or the like.

The present invention may be used in conjunction with various suitable devices and systems, for example, various devices that have a touch-screen; an ATM; a kiosk machine or vending machine that has a touch-screen; a touch-keyboard; a system that utilizes Augmented Reality (AR) components or AR glasses (e.g., Google Glass); a device or system that may detect hovering gestures that do not necessarily touch on the screen or touch-screen; a hovering screen; a system or device that utilize brainwave analysis or brainwave control in which the user's brainwaves are captured or read and the user's brain may directly control an application on the mobile device; and/or other suitable devices or systems.

In accordance with some demonstrative embodiments of the present invention, a method may comprise: monitoring user interactions of a user, who utilizes a computing device to interact with a computerized service during a usage session; and for each particular type of data entry method that the user utilizes during said usage session: calculating a current number of occurrences of utilization of said particular type of data entry method during said usage session, and generating output corresponding to said current number of occurrences during said usage session; calculating a ratio between (A) said current number of occurrences of utilization of said particular type of data entry method during said usage session, and (B) an average number of occurrences of utilization of said particular type of data entry method during previous usage sessions of said user; and generating output corresponding to said ratio; based on (i) said current number of occurrences, and (ii) said average number of occurrences during previous usage sessions of said user, determining whether said user is an authorized user or a cyber-attacker.

In some embodiments, the method may comprise: based on (i) said current number of occurrences, and (ii) said average number of occurrences during previous usage sessions of said user, generating a fraud-score value indicating a likelihood that said user is a cyber-attacker and is not an authorized user.

In some embodiments, the method may comprise: calculating a ratio between (a) said current number of occurrences of utilization of said particular type of data entry method during said usage session, and (b) an average number of occurrences of utilization of said particular type of data entry method during previous usage sessions of a general population of users; and generating output corresponding to said ratio; based on (i) said current number of occurrences, and (ii) said average number of occurrences during previous usage sessions of said general population of users, determining whether said user is an authorized user or a cyber-attacker.

In some embodiments, the method may comprise: based on (i) said current number of occurrences, and (ii) said average number of occurrences during previous usage sessions of said general population of users, generating a fraud-score value indicating a likelihood that said user is a cyber-attacker and is not an authorized user.

In some embodiments, the method may comprise: calculating a ratio between (a) said current number of occurrences of utilization of said particular type of data entry method during said usage session, and (b) an average number of occurrences of utilization of said particular type of data entry method during previous usage sessions of a group of users that excludes said user; and generating output corresponding to said ratio; based on (i) said current number of occurrences, and (ii) said average number of occurrences during previous usage sessions of said group of users that excludes said user, determining whether said user is an authorized user or a cyber-attacker.

In some embodiments, the method may comprise: based on (i) said current number of occurrences, and (ii) said average number of occurrences during previous usage sessions of said group of users that excludes said user, generating a fraud-score value indicating a likelihood that said user is a cyber-attacker and is not an authorized user.

In some embodiments, the method may comprise: checking whether (A) said current number of occurrences of utilization of said particular type of data entry method during said usage session of said user, is different by at least a pre-defined number of percent points, from (B) a threshold value of occurrences that characterizes on average a batch of previous usage sessions of said user.

In some embodiments, said determining may comprise: checking whether (A) said current number of occurrences of utilization of said particular type of data entry method during said usage session of said user, is different by at least a pre-defined number of percent points, from (B) a threshold value of occurrences that characterizes on average a general population of other users of said computerized service.

In some embodiments, the determining may comprise: checking whether (A) said current number of occurrences of utilization of said particular type of data entry method during said usage session of said user, is different by at least a pre-defined number of percent points, from (B) a threshold value of occurrences that characterizes on average a group of users of said computerized service that excludes said user.

In some embodiments, the method may comprise: generating an automated machine-readable fraud-detection rule that detects a fraudulent transaction in an account of another user, wherein the automated machine-readable fraud-detection rule indicates that: if said other user exhibits (A) a current number of occurrences of utilization of said particular type of data entry method during a usage session of said other user, which is different by at least a pre-defined number of percent points, from (B) a threshold value of occurrences that characterizes on average a batch of previous usage sessions of said other user, then generate a possible-fraud alert with regard to the account of said other user.

In some embodiments, the method may comprise: generating an automated machine-readable fraud-detection rule that detects a fraudulent transaction in an account of another user, wherein the automated machine-readable fraud-detection rule indicates that: if said other user exhibits (A) a current number of occurrences of utilization of said particular type of data entry method during a usage session of said other user, which is different by at least a pre-defined number of percent points, from (B) a threshold value of occurrences that characterizes on average a general population of users of said computerized service, then generate a possible-fraud alert with regard to the account of said other user.

In some embodiments, the method may comprise: generating an automated machine-readable fraud-detection rule that detects a fraudulent transaction in an account of another user, wherein the automated machine-readable fraud-detection rule indicates that: if said other user exhibits (A) a current number of occurrences of utilization of said particular type of data entry method during a usage session of said other user, which is different by at least a pre-defined number of percent points, from (B) a threshold value of occurrences that characterizes on average a group of users of said computerized service that excludes said other user, then generate a possible-fraud alert with regard to the account of said other user.

In some embodiments, the method may comprise: based on said determining step, generating an automated machine-readable fraud-detection rule that detects a fraudulent transaction in an account of another user at said computerized service; automatically scanning data reflecting user interactions of said other user with the computerized service; automatically applying said machine-readable fraud-detection rule to said data to automatically determine whether said other user is a cyber-attacker.

In some embodiments, the method may comprise: based on said determining step, generating an automated machine-readable fraud-detection rule that detects a fraudulent transaction in an account of another user at said computerized service; receiving and parsing a fraud-file comprising data reflecting user interactions of one or more users with said computerized service; automatically applying said machine-readable fraud-detection rule to said data to automatically detect at least one other user that is possibly a cyber-attacker.

In some embodiments, the method may comprise: (a) for a particular type of user interaction with a user-interface element of said computerized service, defining at least: (a1) a first data-entry method that users can utilize to engage with said user-interface element, and (a2) a second data-entry method that users can utilize to engage with said user-interface element; (b) for a particular usage session of said user, which is being reviewed for possible fraud, calculating: (b1) a first-method current-session occurrence value, indicating the number of times that said user utilized the first data-entry method to engage with said user-interface element during said particular usage session being reviewed; and (b2) a second-method current-session occurrence value, indicating the number of times that said user utilized the second data-entry method to engage with said user-interface element during said particular usage session being reviewed; (c) for all previous usage sessions of said user, that occurred within a pre-defined time period prior to the particular usage session being reviewed, calculating: (c1) a first-method aggregated occurrence value, indicating the number of times that said user utilized the first data-entry method to engage with said user-interface element during said previous usage sessions; and (c2) a second-method aggregated occurrence value, indicating the number of times that said user utilized the second data-entry method to engage with said user-interface element during said previous sage sessions; (d) generating a table comprising: (d1) the first data-entry method, the first-method current-session occurrence value, and the first-method aggregated occurrence value; and (d2) the second data-entry method, the second-method current-session occurrence value, and the second-method aggregated occurrence value.

In some embodiments, the method may comprise: (a) for a particular type of user interaction with a user-interface element of said computerized service, defining at least: (a1) a first data-entry method that users can utilize to engage with said user-interface element, and (a2) a second data-entry method that users can utilize to engage with said user-interface element; then, (b) for a particular usage session of said user, which is being reviewed for possible fraud, calculating: (b1) a first-method current-session occurrence value, indicating the number of times that said user utilized the first data-entry method to engage with said user-interface element during said particular usage session being reviewed; and (b2) a second-method current-session occurrence value, indicating the number of times that said user utilized the second data-entry method to engage with said user-interface element during said particular usage session being reviewed; (c) for usage sessions of other users, that occurred within a pre-defined time period prior to the particular usage session being reviewed, calculating: (c1) a first-method aggregated occurrence value, indicating the number of times that said other users utilized the first data-entry method to engage with said user-interface element during their previous usage sessions; (c2) a second-method aggregated occurrence value, indicating the number of times that said other users utilized the second data-entry method to engage with said user-interface element during their previous usage sessions; (c3) a first-ratio value indicating a ratio between (A) the first-method aggregated occurrence value of other users as calculated in step (c1), and (B) the first-method current-session occurrence value as calculated in step (b1); and (c4) a second-ratio value indicating a ratio between (A) the second-method aggregated occurrence value of other users as calculated in step (c2), and (B) the second-method current-session occurrence value as calculated in step (b2); then (d) generating and displaying a table comprising at least: (d1) the first data-entry method, and the first-ratio value; and (d2) the second data-entry method, and the second-ratio value.

In some embodiments, the method may comprise: (a) for a particular type of user interaction with a user-interface element of said computerized service, defining at least: (a1) a first data-entry method that users can utilize to engage with said user-interface element, and (a2) a second data-entry method that users can utilize to engage with said user-interface element; (b) for a particular usage session of said user, which is being reviewed for possible fraud, calculating: (b1) a first-method current-session occurrence value, indicating the number of times that said user utilized the first data-entry method to engage with said user-interface element during said particular usage session being reviewed; and (b2) a second-method current-session occurrence value, indicating the number of times that said user utilized the second data-entry method to engage with said user-interface element during said particular usage session being reviewed; (c) for all previous usage sessions of said user, that occurred within a pre-defined time period prior to the particular usage session being reviewed, calculating: (c1) a first-method aggregated occurrence value, indicating the number of times that said user utilized the first data-entry method to engage with said user-interface element during said previous usage sessions; and (c2) a second-method aggregated occurrence value, indicating the number of times that said user utilized the second data-entry method to engage with said user-interface element during said previous sage sessions; (d) if it is determined that the first-method current-session occurrence value as calculated in step (b1), is larger by at least a threshold percentage value relative to the first-method aggregated occurrence value as calculated in step (c1), then determining that said user is a cyber-attacker posing as said user.

In some embodiments, the method may comprise: (a) for a particular type of user interaction with a user-interface element of said computerized service, defining at least: (a1) a first data-entry method that users can utilize to engage with said user-interface element, and (a2) a second data-entry method that users can utilize to engage with said user-interface element; (b) for a particular usage session of said user, which is being reviewed for possible fraud, calculating: (b1) a first-method current-session occurrence value, indicating the number of times that said user utilized the first data-entry method to engage with said user-interface element during said particular usage session being reviewed; and (b2) a second-method current-session occurrence value, indicating the number of times that said user utilized the second data-entry method to engage with said user-interface element during said particular usage session being reviewed; (c) for all previous usage sessions of said user, that occurred within a pre-defined time period prior to the particular usage session being reviewed, calculating: (c1) a first-method aggregated occurrence value, indicating the number of times that said user utilized the first data-entry method to engage with said user-interface element during said previous usage sessions; and (c2) a second-method aggregated occurrence value, indicating the number of times that said user utilized the second data-entry method to engage with said user-interface element during said previous sage sessions; (d) if it is determined that the first-method current-session occurrence value as calculated in step (b1), is smaller by at least a threshold percentage value relative to the first-method aggregated occurrence value as calculated in step (c1), then determining that said user is a cyber-attacker posing as said user.

In some embodiments, the method may comprise: (a) for a particular type of user interaction with a user-interface element of said computerized service, defining at least: (a1) a first data-entry method that users can utilize to engage with said user-interface element, and (a2) a second data-entry method that users can utilize to engage with said user-interface element; (b) for a particular usage session of said user, which is being reviewed for possible fraud, calculating: (b1) a first-method current-session occurrence value, indicating the number of times that said user utilized the first data-entry method to engage with said user-interface element during said particular usage session being reviewed; and (b2) a second-method current-session occurrence value, indicating the number of times that said user utilized the second data-entry method to engage with said user-interface element during said particular usage session being reviewed; (c) for usage sessions of other users, that occurred within a pre-defined time period prior to the particular usage session being reviewed, calculating: (c1) a first-method aggregated occurrence value, indicating the number of times that said other users utilized the first data-entry method to engage with said user-interface element during their previous usage sessions; (c2) a second-method aggregated occurrence value, indicating the number of times that said other users utilized the second data-entry method to engage with said user-interface element during their previous usage sessions; (c3) a first-ratio value indicating a ratio between (A) the first-method aggregated occurrence value of other users as calculated in step (c1), and (B) the first-method current-session occurrence value as calculated in step (b1); (c4) a second-ratio value indicating a ratio between (A) the second-method aggregated occurrence value of other users as calculated in step (c2), and (B) the second-method current-session occurrence value as calculated in step (b2); (d) if the first-ratio value is greater than a pre-defined threshold ratio value, then determining that said user is a cyber-attacker posing as said user.

In some embodiments, the method may comprise: (a) for a particular type of user interaction with a user-interface element of said computerized service, defining at least: (a1) a first data-entry method that users can utilize via a mouse-unit to engage with said user-interface element, and (a2) a second data-entry method that users can utilize via a keyboard to engage with said user-interface element; (b) for a particular usage session of said user, which is being reviewed for possible fraud, calculating: (b1) a first-method current-session occurrence value, indicating the number of times that said user utilized the first data-entry method to engage with said user-interface element during said particular usage session being reviewed; and (b2) a second-method current-session occurrence value, indicating the number of times that said user utilized the second data-entry method to engage with said user-interface element during said particular usage session being reviewed; (c) for all previous usage sessions of said user, that occurred within a pre-defined time period prior to the particular usage session being reviewed, calculating: (c1) a first-method aggregated occurrence value, indicating the number of times that said user utilized the first data-entry method to engage with said user-interface element during said previous usage sessions; and (c2) a second-method aggregated occurrence value, indicating the number of times that said user utilized the second data-entry method to engage with said user-interface element during said previous sage sessions; (d) generating a table comprising: (d1) the first data-entry method, the first-method current-session occurrence value, and the first-method aggregated occurrence value; and (d2) the second data-entry method, the second-method current-session occurrence value, and the second-method aggregated occurrence value.

In some embodiments, the method may comprise: (a) for a particular type of user interaction with a user-interface element of said computerized service, defining at least: (a1) a first data-entry method that users can utilize via a mouse-unit to engage with said user-interface element, and (a2) a second data-entry method that users can utilize via a keyboard to engage with said user-interface element; (b) for a particular usage session of said user, which is being reviewed for possible fraud, calculating: (b1) a first-method current-session occurrence value, indicating the number of times that said user utilized the first data-entry method to engage with said user-interface element during said particular usage session being reviewed; and (b2) a second-method current-session occurrence value, indicating the number of times that said user utilized the second data-entry method to engage with said user-interface element during said particular usage session being reviewed; (c) for usage sessions of other users, that occurred within a pre-defined time period prior to the particular usage session being reviewed, calculating: (c1) a first-method aggregated occurrence value, indicating the number of times that said other users utilized the first data-entry method to engage with said user-interface element during their previous usage sessions; (c2) a second-method aggregated occurrence value, indicating the number of times that said other users utilized the second data-entry method to engage with said user-interface element during their previous usage sessions; (c3) a first-ratio value indicating a ratio between (A) the first-method aggregated occurrence value of other users as calculated in step (c1), and (B) the first-method current-session occurrence value as calculated in step (b1); (c4) a second-ratio value indicating a ratio between (A) the second-method aggregated occurrence value of other users as calculated in step (c2), and (B) the second-method current-session occurrence value as calculated in step (b2); (d) generating and displaying a table comprising at least: (d1) the first data-entry method, and the first-ratio value; and (d2) the second data-entry method, and the second-ratio value.

In some embodiments, the method may comprise: (a) for a particular type of user interaction with a user-interface element of said computerized service, defining at least: (a1) a first data-entry method that users can utilize via a mouse-unit to engage with said user-interface element, and (a2) a second data-entry method that users can utilize via a keyboard to engage with said user-interface element; (b) for a particular usage session of said user, which is being reviewed for possible fraud, calculating: (b1) a first-method current-session occurrence value, indicating the number of times that said user utilized the first data-entry method to engage with said user-interface element during said particular usage session being reviewed; and (b2) a second-method current-session occurrence value, indicating the number of times that said user utilized the second data-entry method to engage with said user-interface element during said particular usage session being reviewed; (c) for all previous usage sessions of said user, that occurred within a pre-defined time period prior to the particular usage session being reviewed, calculating: (c1) a first-method aggregated occurrence value, indicating the number of times that said user utilized the first data-entry method to engage with said user-interface element during said previous usage sessions; and (c2) a second-method aggregated occurrence value, indicating the number of times that said user utilized the second data-entry method to engage with said user-interface element during said previous sage sessions; (d) if it is determined that the first-method current-session occurrence value as calculated in step (b1), is larger by at least a threshold percentage value relative to the first-method aggregated occurrence value as calculated in step (c1), then determining that said user is a cyber-attacker posing as said user.

In some embodiments, the method may comprise: (a) for a particular type of user interaction with a user-interface element of said computerized service, defining at least: (a1) a first data-entry method that users can utilize via a mouse-unit to engage with said user-interface element, and (a2) a second data-entry method that users can utilize via a keyboard to engage with said user-interface element; (b) for a particular usage session of said user, which is being reviewed for possible fraud, calculating: (b1) a first-method current-session occurrence value, indicating the number of times that said user utilized the first data-entry method to engage with said user-interface element during said particular usage session being reviewed; and (b2) a second-method current-session occurrence value, indicating the number of times that said user utilized the second data-entry method to engage with said user-interface element during said particular usage session being reviewed; (c) for all previous usage sessions of said user, that occurred within a pre-defined time period prior to the particular usage session being reviewed, calculating: (c1) a first-method aggregated occurrence value, indicating the number of times that said user utilized the first data-entry method to engage with said user-interface element during said previous usage sessions; and (c2) a second-method aggregated occurrence value, indicating the number of times that said user utilized the second data-entry method to engage with said user-interface element during said previous sage sessions; (d) if it is determined that the first-method current-session occurrence value as calculated in step (b1), is smaller by at least a threshold percentage value relative to the first-method aggregated occurrence value as calculated in step (c1), then determining that said user is a cyber-attacker posing as said user.

In some embodiments, the method may comprise: (a) for a particular type of user interaction with a user-interface element of said computerized service, defining at least: (a1) a first data-entry method that users can utilize via a mouse-unit to engage with said user-interface element, and (a2) a second data-entry method that users can utilize via a keyboard to engage with said user-interface element; (b) for a particular usage session of said user, which is being reviewed for possible fraud, calculating: (b1) a first-method current-session occurrence value, indicating the number of times that said user utilized the first data-entry method to engage with said user-interface element during said particular usage session being reviewed; and (b2) a second-method current-session occurrence value, indicating the number of times that said user utilized the second data-entry method to engage with said user-interface element during said particular usage session being reviewed; (c) for usage sessions of other users, that occurred within a pre-defined time period prior to the particular usage session being reviewed, calculating: (c1) a first-method aggregated occurrence value, indicating the number of times that said other users utilized the first data-entry method to engage with said user-interface element during their previous usage sessions; (c2) a second-method aggregated occurrence value, indicating the number of times that said other users utilized the second data-entry method to engage with said user-interface element during their previous usage sessions; (c3) a first-ratio value indicating a ratio between (A) the first-method aggregated occurrence value of other users as calculated in step (c1), and (B) the first-method current-session occurrence value as calculated in step (b1); (c4) a second-ratio value indicating a ratio between (A) the second-method aggregated occurrence value of other users as calculated in step (c2), and (B) the second-method current-session occurrence value as calculated in step (b2); (d) if the first-ratio value is greater than a pre-defined threshold ratio value, then determining that said user is a cyber-attacker posing as said user.

In some embodiments, the method may comprise: (A) automatically scanning the user interactions performed in usage sessions of a batch of other users of said computerized service; (B) calculating separately for each account owner of said batch of other users, (B1) a first-method current-session occurrence value, indicating the number of times that said account owner utilized the first data-entry method to engage with said user-interface element during a particular usage session being reviewed; (B2) a first-method aggregated occurrence value, indicating the number of times that said other users except said account owner utilized the first data-entry method to engage with said user-interface element during their previous usage sessions; (B3) a first-ratio value indicating a ratio between (x) the first-method aggregated occurrence value calculated in step (B2), and (y) the first-method current-session occurrence value as calculated in step (B1); and (C) automatically generating a list of account owners, out of said other users of the computerized service, for which: the first-ratio value is greater than a pre-defined threshold ratio value.

In some embodiments, the method may comprise: (A) automatically scanning the user interactions performed in usage sessions of a batch of other users of said computerized service; (B) calculating separately for each account owner of said batch of other users, (B1) a first-method current-session occurrence value, indicating the number of times that said account owner utilized the first data-entry method to engage with said user-interface element during a particular usage session being reviewed; (B2) a first-method aggregated occurrence value, indicating the number of times that said other users except said account owner utilized the first data-entry method to engage with said user-interface element during their previous usage sessions; (B3) a first-ratio value indicating a ratio between (x) the first-method aggregated occurrence value calculated in step (B2), and (y) the first-method current-session occurrence value as calculated in step (B1); and (C) if the first-ratio value of said account owner is greater than a pre-defined threshold ratio value, then automatically determining that the account of said account user was exposed to a cyber-attack.

In some embodiments, the method may comprise: based on analysis of said user interactions, calculating a fraud-score value indicating a fraud-risk associated with said usage session; generating and displaying on a screen of a computer located remotely from said user, a graphical user interface (GUI) element which comprises: (A) an indication of said fraud-score value; (B) an indication of a lowest-limit fraud-score value; (C) an indication of an upper-limit fraud-score value.

In some embodiments, the generating and displaying may comprise: generating and displaying on said screen of said computer located remotely from said user, an on-screen gauge representation which comprises: an on-screen needle representation pointing to a particular location along a circumference of said on-screen gauge representation, the on-screen needle representation indicating a value between said lowest-limit fraud-score value and said upper-limit fraud-score value.

In some embodiments, the generating and displaying may comprise: generating and displaying on said screen of said computer located remotely from said user, an on-screen partial-ring-shaped gauge representation which comprises: an on-screen needle representation pointing to a particular location along a circumference of said on-screen partial-ring-shaped gauge representation; wherein a relative position of said particular location along the circumference of said on-screen partial-ring-shaped gauge representation, corresponds to the relative location of the fraud-score value along a number line that begins at the lowest-limit fraud-score value and ends with the upper-limit fraud-score value.

In some embodiments, the generating and displaying may comprise: generating and displaying on said screen of said computer located remotely from said user, an on-screen partial-ring-shaped gauge representation which comprises: an on-screen needle representation pointing to a particular location along a circumference of said on-screen partial-ring-shaped gauge representation; wherein: the circumference distance between said particular location and said indication of lowest-limit fraud-score value, divided by the circumference distance between said indication of lowest-limit fraud-score value and said indication of upper-limit fraud-score value, is generally equal to the fraud-score value minus the lowest-limit fraud-score value, divided by the difference between the upper-limit fraud-score value and the lowest-limit fraud-score value.

In some embodiments, the method may comprise: based on analysis of said user interactions performed via a mouse unit, calculating a mouse dynamics fraud-score value indicating a fraud-risk associated with said usage session; generating and displaying on the screen of said computer located remotely from said user, an on-screen generally-circular gauge element which comprises: (A) an indication of said mouse dynamics fraud-score value; (B) an indication of a lowest-limit fraud-score value associated with mouse dynamics; (C) an indication of an upper-limit fraud-score value associated with mouse dynamics.

In some embodiments, the method may comprise: based on analysis of said user interactions performed via keyboard, calculating a keyboard dynamics fraud-score value indicating a fraud-risk associated with said usage session; generating and displaying on the screen of said computer located remotely from said user, an on-screen generally-circular gauge element which comprises: (A) an indication of said keyboard dynamics fraud-score value; (B) an indication of a lowest-limit fraud-score value associated with keyboard dynamics; (C) an indication of an upper-limit fraud-score value associated with keyboard dynamics.

In some embodiments, the method may comprise: based on analysis of timings of said user interactions, calculating a timing-related fraud-score value indicating a fraud-risk associated with said usage session; generating and displaying on the screen of said computer located remotely from said user, an on-screen generally-circular gauge element which comprises: (A) an indication of said timing-related fraud-score value; (B) an indication of a timing-related lowest-limit fraud-score value; (C) an indication of a timing-related upper-limit fraud-score value.

In some embodiments, the method may comprise: based on analysis of access time reflected in said user interactions, calculating an access time fraud-score value indicating a fraud-risk associated with said usage session; generating and displaying on the screen of said computer located remotely from said user, an on-screen generally-circular gauge element which comprises: (A) an indication of said access time fraud-score value; (B) an indication of access time lowest-limit fraud-score value; (C) an indication of access time upper-limit fraud-score value.

In some embodiments, the method may comprise: based on analysis of said user interactions, calculating at least (A) a first fraud-score value associated with a first behavioral aspect reflected in said user interactions, and (B) a second fraud-score value associated with a second behavioral aspect reflected in said user interactions; calculating a weighted fraud-score value based on said first fraud-score value and said second fraud-score value; displaying, on the screen of said computer located remotely from said user, at least the weighted fraud-score value.

In some embodiments, the method may comprise: based on analysis of said user interactions, calculating at least (A) a first fraud-score value associated with a first behavioral aspect reflected in said user interactions, and (B) a second fraud-score value associated with a second behavioral aspect reflected in said user interactions; calculating a weighted fraud-score value based on said first fraud-score value and said second fraud-score value; generating and displaying, on the screen of said computer located remotely from said user, an on-screen interface which comprises: (x) a first gauge indicating the first fraud-score value; (y) a second gauge indicating the second fraud-score value; (z) a third gauge indicating the weighted fraud-score value.

In some embodiments, the method may comprise: detecting and storing in a repository the Internet Protocol (IP) address of each usage session of said user with the computerized service; converting each IP address of each usage session of said user, into a geo-spatial location on Earth; displaying a graphical representation of a map of Earth; displaying on said map of Earth multiple representations of pins, wherein the number of pins displayed is equal to the number of usage sessions of said user with the computerized service; wherein each pin is displayed at a map location that corresponds to the geo-spatial location on Earth from which a corresponding usage session of said user has occurred.

In some embodiments, the method may comprise: detecting and storing in a repository the Internet Protocol (IP) address of each usage session of said user with the computerized service; converting each IP address of each usage session of said user, into a geo-spatial location on Earth; displaying a graphical representation of a map of Earth; displaying on said map of Earth multiple representations of pins; wherein the number of pins displayed is smaller than the number of usage sessions of said user with the computerized service; wherein each pin is displayed at a map location that corresponds to the geo-spatial location on Earth from which at least one corresponding usage session of said user has occurred; wherein each pin further displays a numeric value that indicates the aggregate number of usage sessions of said user that occurred from multiple geo-spatial locations that are within a pre-defined radius around the map location to which said pin points.

In some embodiments, the method may comprise: detecting and storing in a repository the Internet Protocol (IP) address of each usage session of said user with the computerized service; converting each IP address of each usage session of said user, into an IP-based geo-spatial location on Earth; determining an actual geo-spatial location on Earth for each one of said usage sessions of said user, based on a combination of both: (A) said IP-based geo-spatial location, and (B) at least one more parameter selected from the group consisting of: a language in which said user interacts with the computerized service, a language in which a keyboard of said user is able to type, a language that said user selected for user interface of said computerized service; displaying a graphical representation of a map of Earth; displaying on said map of Earth multiple representations of pins; wherein the number of pins displayed is equal to the number of usage sessions of said user with the computerized service; wherein each pin is displayed at a map location that corresponds to the actual geo-spatial location on Earth from which a corresponding usage session of said user has occurred.

Modules, elements, systems and/or sub-systems described herein may be implemented by using hardware components and/or software modules; for example, utilizing a processor, a controller, an Integrated Circuit (IC), a logic unit, memory unit, storage unit, input unit, output unit, wireless modem or transceiver, wired modem or transceiver, internal or external power source, database or data repository, Operating System (OS), drivers, software applications, or the like. Some embodiments may utilize client/server architecture, distributed architecture, peer-to-peer architecture, and/or other suitable architectures; as well as one or more wired and/or wireless communication protocols, links and/or networks.

Although portions of the discussion herein relate, for demonstrative purposes, to wired links and/or wired communications, some embodiments of the present invention are not limited in this regard, and may include one or more wired or wireless links, may utilize one or more components of wireless communication, may utilize one or more methods or protocols of wireless communication, or the like. Some embodiments may utilize wired communication and/or wireless communication.

Functions, operations, components and/or features described herein with reference to one or more embodiments of the present invention, may be combined with, or may be utilized in combination with, one or more other functions, operations, components and/or features described herein with reference to one or more other embodiments of the present invention.

While certain features of the present invention have been illustrated and described herein, many modifications, substitutions, changes, and equivalents may occur to those skilled in the art. Accordingly, the claims are intended to cover all such modifications, substitutions, changes, and equivalents.

What is claimed is:

1. A method comprising:
monitoring user interactions of a user, who utilizes a computing device to interact with a computerized service during a usage session;
for each particular type of data entry method that the user utilizes during said usage session:
calculating a current number of occurrences of utilization of said particular type of data entry method during said usage session, and generating output corresponding to said current number of occurrences during said usage session;

calculating a ratio between (A) said current number of occurrences of utilization of said particular type of data entry method during said usage session, and (B) an average number of occurrences of utilization of said particular type of data entry method during previous usage sessions of said user; and generating output corresponding to said ratio;

based on (i) said current number of occurrences, and (ii) said average number of occurrences during previous usage sessions of said user, determining whether said user is an authorized user or a cyber-attacker;

wherein the method comprises:

(a) for a particular type of user interaction with a user-interface element of said computerized service, defining at least:
  (a1) a first data-entry method that users can utilize to engage with said user-interface element, and
  (a2) a second data-entry method that users can utilize to engage with said user-interface element;

(b) for a particular usage session of said user, which is being reviewed for possible fraud, calculating:
  (b1) a first-method current-session occurrence value, indicating the number of times that said user utilized the first data-entry method to engage with said user-interface element during said particular usage session being reviewed; and
  (b2) a second-method current-session occurrence value, indicating the number of times that said user utilized the second data-entry method to engage with said user-interface element during said particular usage session being reviewed;

(c) for all previous usage sessions of said user, that occurred within a pre-defined time period prior to the particular usage session being reviewed, calculating:
  (c1) a first-method aggregated occurrence value, indicating the number of times that said user utilized the first data-entry method to engage with said user-interface element during said previous usage sessions; and
  (c2) a second-method aggregated occurrence value, indicating the number of times that said user utilized the second data-entry method to engage with said user-interface element during said previous sage sessions;

(d) generating a table comprising:
  (d1) the first data-entry method, the first-method current-session occurrence value, and the first-method aggregated occurrence value; and
  (d2) the second data-entry method, the second-method current-session occurrence value, and the second-method aggregated occurrence value.

2. The method of claim 1, comprising:
based on (i) said current number of occurrences, and (ii) said average number of occurrences during previous usage sessions of said user, generating a fraud-score value indicating a likelihood that said user is a cyber-attacker and is not an authorized user.

3. The method of claim 1, comprising:
calculating a ratio between (a) said current number of occurrences of utilization of said particular type of data entry method during said usage session, and (b) an average number of occurrences of utilization of said particular type of data entry method during previous usage sessions of a general population of users; and generating output corresponding to said ratio;

based on (i) said current number of occurrences, and (ii) said average number of occurrences during previous usage sessions of said general population of users, determining whether said user is an authorized user or a cyber-attacker.

4. The method of claim 3, comprising:
based on (i) said current number of occurrences, and (ii) said average number of occurrences during previous usage sessions of said general population of users, generating a fraud-score value indicating a likelihood that said user is a cyber-attacker and is not an authorized user.

5. The method of claim 1, comprising:
calculating a ratio between (a) said current number of occurrences of utilization of said particular type of data entry method during said usage session, and (b) an average number of occurrences of utilization of said particular type of data entry method during previous usage sessions of a group of users that excludes said user; and generating output corresponding to said ratio;

based on (i) said current number of occurrences, and (ii) said average number of occurrences during previous usage sessions of said group of users that excludes said user, determining whether said user is an authorized user or a cyber-attacker.

6. The method of claim 5, comprising:
based on (i) said current number of occurrences, and (ii) said average number of occurrences during previous usage sessions of said group of users that excludes said user, generating a fraud-score value indicating a likelihood that said user is a cyber-attacker and is not an authorized user.

7. The method of claim 1, wherein said determining comprises:
checking whether (A) said current number of occurrences of utilization of said particular type of data entry method during said usage session of said user, is different by at least a pre-defined number of percent points, from (B) a threshold value of occurrences that characterizes on average a batch of previous usage sessions of said user.

8. The method of claim 1, wherein said determining comprises:
checking whether (A) said current number of occurrences of utilization of said particular type of data entry method during said usage session of said user, is different by at least a pre-defined number of percent points, from (B) a threshold value of occurrences that characterizes on average a general population of other users of said computerized service.

9. The method of claim 1, wherein said determining comprises:
checking whether (A) said current number of occurrences of utilization of said particular type of data entry method during said usage session of said user, is different by at least a pre-defined number of percent points, from (B) a threshold value of occurrences that characterizes on average a group of users of said computerized service that excludes said user.

10. The method of claim 1, further comprising:
generating an automated machine-readable fraud-detection rule that detects a fraudulent transaction in an account of another user, wherein the automated machine-readable fraud-detection rule indicates that: if said other user exhibits (A) a current number of occurrences of utilization of said particular type of data entry method during a usage session of said other user, which is different by at least a pre-defined number of percent points, from (B) a threshold value of occurrences that characterizes on average a batch of previous usage sessions of said other user, then generate a possible-fraud alert with regard to the account of said other user.

11. The method of claim 1, further comprising:
generating an automated machine-readable fraud-detection rule that detects a fraudulent transaction in an account of another user, wherein the automated machine-readable fraud-detection rule indicates that: if said other user exhibits (A) a current number of occurrences of utilization of said particular type of data entry method during a usage session of said other user, which is different by at least a pre-defined number of percent points, from (B) a threshold value of occurrences that characterizes on average a general population of users of said computerized service, then generate a possible-fraud alert with regard to the account of said other user.

12. The method of claim 1, further comprising:
generating an automated machine-readable fraud-detection rule that detects a fraudulent transaction in an account of another user, wherein the automated machine-readable fraud-detection rule indicates that: if said other user exhibits (A) a current number of occurrences of utilization of said particular type of data entry method during a usage session of said other user, which is different by at least a pre-defined number of percent points, from (B) a threshold value of occurrences that characterizes on average a group of users of said computerized service that excludes said other user, then generate a possible-fraud alert with regard to the account of said other user.

13. The method of claim 1, further comprising:
based on said determining step,
generating an automated machine-readable fraud-detection rule that detects a fraudulent transaction in an account of another user at said computerized service;
automatically scanning data reflecting user interactions of said other user with the computerized service;
automatically applying said machine-readable fraud-detection rule to said data to automatically determine whether said other user is a cyber-attacker.

14. The method of claim 1, further comprising:
based on said determining step,
generating an automated machine-readable fraud-detection rule that detects a fraudulent transaction in an account of another user at said computerized service;
receiving and parsing a fraud-file comprising data reflecting user interactions of one or more users with said computerized service;
automatically applying said machine-readable fraud-detection rule to said data to automatically detect at least one other user that is possibly a cyber-attacker.

15. A method comprising:
monitoring user interactions of a user, who utilizes a computing device to interact with a computerized service during a usage session;
for each particular type of data entry method that the user utilizes during said usage session:
calculating a current number of occurrences of utilization of said particular type of data entry method during said usage session, and generating output corresponding to said current number of occurrences during said usage session;
calculating a ratio between (A) said current number of occurrences of utilization of said particular type of data entry method during said usage session, and (B) an average number of occurrences of utilization of said particular type of data entry method during previous usage sessions of said user; and generating output corresponding to said ratio;
based on (i) said current number of occurrences, and (ii) said average number of occurrences during previous usage sessions of said user, determining whether said user is an authorized user or a cyber-attacker;
wherein the method comprises:
(a) for a particular type of user interaction with a user-interface element of said computerized service, defining at least:
  (a1) a first data-entry method that users can utilize to engage with said user-interface element, and
  (a2) a second data-entry method that users can utilize to engage with said user-interface element;
(b) for a particular usage session of said user, which is being reviewed for possible fraud, calculating:
  (b1) a first-method current-session occurrence value, indicating the number of times that said user utilized the first data-entry method to engage with said user-interface element during said particular usage session being reviewed; and
  (b2) a second-method current-session occurrence value, indicating the number of times that said user utilized the second data-entry method to engage with said user-interface element during said particular usage session being reviewed;
(c) for usage sessions of other users, that occurred within a pre-defined time period prior to the particular usage session being reviewed, calculating:
  (c1) a first-method aggregated occurrence value, indicating the number of times that said other users utilized the first data-entry method to engage with said user-interface element during their previous usage sessions;
  (c2) a second-method aggregated occurrence value, indicating the number of times that said other users utilized the second data-entry method to engage with said user-interface element during their previous usage sessions;
  (c3) a first-ratio value indicating a ratio between (A) the first-method aggregated occurrence value of other users as calculated in step (c1), and (B) the first-method current-session occurrence value as calculated in step (b1);
  (c4) a second-ratio value indicating a ratio between (A) the second-method aggregated occurrence value of other users as calculated in step (c2), and (B) the second-method current-session occurrence value as calculated in step (b2);
(d) generating and displaying a table comprising at least:
  (d1) the first data-entry method, and the first-ratio value; and
  (d2) the second data-entry method, and the second-ratio value.

16. A method comprising:
monitoring user interactions of a user, who utilizes a computing device to interact with a computerized service during a usage session;
for each particular type of data entry method that the user utilizes during said usage session:
calculating a current number of occurrences of utilization of said particular type of data entry method during said usage session, and generating output corresponding to said current number of occurrences during said usage session;

calculating a ratio between (A) said current number of occurrences of utilization of said particular type of data entry method during said usage session, and (B) an average number of occurrences of utilization of said particular type of data entry method during previous usage sessions of said user; and generating output corresponding to said ratio;

based on (i) said current number of occurrences, and (ii) said average number of occurrences during previous usage sessions of said user, determining whether said user is an authorized user or a cyber-attacker;

wherein the method comprises:

(a) for a particular type of user interaction with a user-interface element of said computerized service, defining at least:
   (a1) a first data-entry method that users can utilize to engage with said user-interface element, and
   (a2) a second data-entry method that users can utilize to engage with said user-interface element;

(b) for a particular usage session of said user, which is being reviewed for possible fraud, calculating:
   (b1) a first-method current-session occurrence value, indicating the number of times that said user utilized the first data-entry method to engage with said user-interface element during said particular usage session being reviewed; and
   (b2) a second-method current-session occurrence value, indicating the number of times that said user utilized the second data-entry method to engage with said user-interface element during said particular usage session being reviewed;

(c) for all previous usage sessions of said user, that occurred within a pre-defined time period prior to the particular usage session being reviewed, calculating:
   (c1) a first-method aggregated occurrence value, indicating the number of times that said user utilized the first data-entry method to engage with said user-interface element during said previous usage sessions; and
   (c2) a second-method aggregated occurrence value, indicating the number of times that said user utilized the second data-entry method to engage with said user-interface element during said previous sage sessions;

(d) if it is determined that the first-method current-session occurrence value as calculated in step (b1), is larger by at least a threshold percentage value relative to the first-method aggregated occurrence value as calculated in step (c1), then determining that said user is a cyber-attacker posing as said user.

17. A method comprising:

monitoring user interactions of a user, who utilizes a computing device to interact with a computerized service during a usage session;

for each particular type of data entry method that the user utilizes during said usage session:

calculating a current number of occurrences of utilization of said particular type of data entry method during said usage session, and generating output corresponding to said current number of occurrences during said usage session;

calculating a ratio between (A) said current number of occurrences of utilization of said particular type of data entry method during said usage session, and (B) an average number of occurrences of utilization of said particular type of data entry method during previous usage sessions of said user; and generating output corresponding to said ratio;

based on (i) said current number of occurrences, and (ii) said average number of occurrences during previous usage sessions of said user, determining whether said user is an authorized user or a cyber-attacker;

wherein the method comprises:

(a) for a particular type of user interaction with a user-interface element of said computerized service, defining at least:
   (a1) a first data-entry method that users can utilize to engage with said user-interface element, and
   (a2) a second data-entry method that users can utilize to engage with said user-interface element;

(b) for a particular usage session of said user, which is being reviewed for possible fraud, calculating:
   (b1) a first-method current-session occurrence value, indicating the number of times that said user utilized the first data-entry method to engage with said user-interface element during said particular usage session being reviewed; and
   (b2) a second-method current-session occurrence value, indicating the number of times that said user utilized the second data-entry method to engage with said user-interface element during said particular usage session being reviewed;

(c) for all previous usage sessions of said user, that occurred within a pre-defined time period prior to the particular usage session being reviewed, calculating:
   (c1) a first-method aggregated occurrence value, indicating the number of times that said user utilized the first data-entry method to engage with said user-interface element during said previous usage sessions; and
   (c2) a second-method aggregated occurrence value, indicating the number of times that said user utilized the second data-entry method to engage with said user-interface element during said previous sage sessions;

(d) if it is determined that the first-method current-session occurrence value as calculated in step (b1), is smaller by at least a threshold percentage value relative to the first-method aggregated occurrence value as calculated in step (c1), then determining that said user is a cyber-attacker posing as said user.

18. A method comprising:

monitoring user interactions of a user, who utilizes a computing device to interact with a computerized service during a usage session;

for each particular type of data entry method that the user utilizes during said usage session:

calculating a current number of occurrences of utilization of said particular type of data entry method during said usage session, and generating output corresponding to said current number of occurrences during said usage session;

calculating a ratio between (A) said current number of occurrences of utilization of said particular type of data entry method during said usage session, and (B) an average number of occurrences of utilization of said particular type of data entry method during previous usage sessions of said user; and generating output corresponding to said ratio;

based on (i) said current number of occurrences, and (ii) said average number of occurrences during previous usage sessions of said user, determining whether said user is an authorized user or a cyber-attacker;
wherein the method comprises:
(a) for a particular type of user interaction with a user-interface element of said computerized service, defining at least:
  (a1) a first data-entry method that users can utilize to engage with said user-interface element, and
  (a2) a second data-entry method that users can utilize to engage with said user-interface element;
(b) for a particular usage session of said user, which is being reviewed for possible fraud, calculating:
  (b1) a first-method current-session occurrence value, indicating the number of times that said user utilized the first data-entry method to engage with said user-interface element during said particular usage session being reviewed; and
  (b2) a second-method current-session occurrence value, indicating the number of times that said user utilized the second data-entry method to engage with said user-interface element during said particular usage session being reviewed;
(c) for usage sessions of other users, that occurred within a pre-defined time period prior to the particular usage session being reviewed, calculating:
  (c1) a first-method aggregated occurrence value, indicating the number of times that said other users utilized the first data-entry method to engage with said user-interface element during their previous usage sessions;
  (c2) a second-method aggregated occurrence value, indicating the number of times that said other users utilized the second data-entry method to engage with said user-interface element during their previous usage sessions;
  (c3) a first-ratio value indicating a ratio between (A) the first-method aggregated occurrence value of other users as calculated in step (c1), and (B) the first-method current-session occurrence value as calculated in step (b1);
  (c4) a second-ratio value indicating a ratio between (A) the second-method aggregated occurrence value of other users as calculated in step (c2), and (B) the second-method current-session occurrence value as calculated in step (b2);
(d) if the first-ratio value is greater than a pre-defined threshold ratio value, then determining that said user is a cyber-attacker posing as said user.

19. A method comprising:
monitoring user interactions of a user, who utilizes a computing device to interact with a computerized service during a usage session;
for each particular type of data entry method that the user utilizes during said usage session:
calculating a current number of occurrences of utilization of said particular type of data entry method during said usage session, and generating output corresponding to said current number of occurrences during said usage session;
calculating a ratio between (A) said current number of occurrences of utilization of said particular type of data entry method during said usage session, and (B) an average number of occurrences of utilization of said particular type of data entry method during previous usage sessions of said user; and generating output corresponding to said ratio;
based on (i) said current number of occurrences, and (ii) said average number of occurrences during previous usage sessions of said user, determining whether said user is an authorized user or a cyber-attacker;
wherein the method comprises:
(a) for a particular type of user interaction with a user-interface element of said computerized service, defining at least:
  (a1) a first data-entry method that users can utilize via a mouse-unit to engage with said user-interface element, and
  (a2) a second data-entry method that users can utilize via a keyboard to engage with said user-interface element;
(b) for a particular usage session of said user, which is being reviewed for possible fraud, calculating:
  (b1) a first-method current-session occurrence value, indicating the number of times that said user utilized the first data-entry method to engage with said user-interface element during said particular usage session being reviewed; and
  (b2) a second-method current-session occurrence value, indicating the number of times that said user utilized the second data-entry method to engage with said user-interface element during said particular usage session being reviewed;
(c) for all previous usage sessions of said user, that occurred within a pre-defined time period prior to the particular usage session being reviewed, calculating:
  (c1) a first-method aggregated occurrence value, indicating the number of times that said user utilized the first data-entry method to engage with said user-interface element during said previous usage sessions; and
  (c2) a second-method aggregated occurrence value, indicating the number of times that said user utilized the second data-entry method to engage with said user-interface element during said previous sage sessions;
(d) generating a table comprising:
  (d1) the first data-entry method, the first-method current-session occurrence value, and the first-method aggregated occurrence value; and
  (d2) the second data-entry method, the second-method current-session occurrence value, and the second-method aggregated occurrence value.

20. A method comprising:
monitoring user interactions of a user, who utilizes a computing device to interact with a computerized service during a usage session;
for each particular type of data entry method that the user utilizes during said usage session:
calculating a current number of occurrences of utilization of said particular type of data entry method during said usage session, and generating output corresponding to said current number of occurrences during said usage session;
calculating a ratio between (A) said current number of occurrences of utilization of said particular type of data entry method during said usage session, and (B) an average number of occurrences of utilization of said particular type of data entry method during previous usage sessions of said user; and generating output corresponding to said ratio;
based on (i) said current number of occurrences, and (ii) said average number of occurrences during previous usage sessions of said user, determining whether said user is an authorized user or a cyber-attacker;

wherein the method comprises:

(a) for a particular type of user interaction with a user-interface element of said computerized service, defining at least:
  (a1) a first data-entry method that users can utilize via a mouse-unit to engage with said user-interface element, and
  (a2) a second data-entry method that users can utilize via a keyboard to engage with said user-interface element;

(b) for a particular usage session of said user, which is being reviewed for possible fraud, calculating:
  (b1) a first-method current-session occurrence value, indicating the number of times that said user utilized the first data-entry method to engage with said user-interface element during said particular usage session being reviewed; and
  (b2) a second-method current-session occurrence value, indicating the number of times that said user utilized the second data-entry method to engage with said user-interface element during said particular usage session being reviewed;

(c) for usage sessions of other users, that occurred within a pre-defined time period prior to the particular usage session being reviewed, calculating:
  (c1) a first-method aggregated occurrence value, indicating the number of times that said other users utilized the first data-entry method to engage with said user-interface element during their previous usage sessions;
  (c2) a second-method aggregated occurrence value, indicating the number of times that said other users utilized the second data-entry method to engage with said user-interface element during their previous usage sessions;
  (c3) a first-ratio value indicating a ratio between (A) the first-method aggregated occurrence value of other users as calculated in step (c1), and (B) the first-method current-session occurrence value as calculated in step (b1);
  (c4) a second-ratio value indicating a ratio between (A) the second-method aggregated occurrence value of other users as calculated in step (c2), and (B) the second-method current-session occurrence value as calculated in step (b2);

(d) generating and displaying a table comprising at least:
  (d1) the first data-entry method, and the first-ratio value; and
  (d2) the second data-entry method, and the second-ratio value.

21. A method comprising:

monitoring user interactions of a user, who utilizes a computing device to interact with a computerized service during a usage session;

for each particular type of data entry method that the user utilizes during said usage session:

calculating a current number of occurrences of utilization of said particular type of data entry method during said usage session, and generating output corresponding to said current number of occurrences during said usage session;

calculating a ratio between (A) said current number of occurrences of utilization of said particular type of data entry method during said usage session, and (B) an average number of occurrences of utilization of said particular type of data entry method during previous usage sessions of said user; and generating output corresponding to said ratio;

based on (i) said current number of occurrences, and (ii) said average number of occurrences during previous usage sessions of said user, determining whether said user is an authorized user or a cyber-attacker;

wherein the method comprises:

(a) for a particular type of user interaction with a user-interface element of said computerized service, defining at least:
  (a1) a first data-entry method that users can utilize via a mouse-unit to engage with said user-interface element, and
  (a2) a second data-entry method that users can utilize via a keyboard to engage with said user-interface element;

(b) for a particular usage session of said user, which is being reviewed for possible fraud, calculating:
  (b1) a first-method current-session occurrence value, indicating the number of times that said user utilized the first data-entry method to engage with said user-interface element during said particular usage session being reviewed; and
  (b2) a second-method current-session occurrence value, indicating the number of times that said user utilized the second data-entry method to engage with said user-interface element during said particular usage session being reviewed;

(c) for all previous usage sessions of said user, that occurred within a pre-defined time period prior to the particular usage session being reviewed, calculating:
  (c1) a first-method aggregated occurrence value, indicating the number of times that said user utilized the first data-entry method to engage with said user-interface element during said previous usage sessions; and
  (c2) a second-method aggregated occurrence value, indicating the number of times that said user utilized the second data-entry method to engage with said user-interface element during said previous sage sessions;

(d) if it is determined that the first-method current-session occurrence value as calculated in step (b1), is larger by at least a threshold percentage value relative to the first-method aggregated occurrence value as calculated in step (c1), then determining that said user is a cyber-attacker posing as said user.

22. A method comprising:

monitoring user interactions of a user, who utilizes a computing device to interact with a computerized service during a usage session;

for each particular type of data entry method that the user utilizes during said usage session:

calculating a current number of occurrences of utilization of said particular type of data entry method during said usage session, and generating output corresponding to said current number of occurrences during said usage session;

calculating a ratio between (A) said current number of occurrences of utilization of said particular type of data entry method during said usage session, and (B) an average number of occurrences of utilization of said particular type of data entry method during previous usage sessions of said user; and generating output corresponding to said ratio;

based on (i) said current number of occurrences, and (ii) said average number of occurrences during previous usage sessions of said user, determining whether said user is an authorized user or a cyber-attacker;

wherein the method comprises:

(a) for a particular type of user interaction with a user-interface element of said computerized service, defining at least:
  (a1) a first data-entry method that users can utilize via a mouse-unit to engage with said user-interface element, and
  (a2) a second data-entry method that users can utilize via a keyboard to engage with said user-interface element;

(b) for a particular usage session of said user, which is being reviewed for possible fraud, calculating:
  (b1) a first-method current-session occurrence value, indicating the number of times that said user utilized the first data-entry method to engage with said user-interface element during said particular usage session being reviewed; and
  (b2) a second-method current-session occurrence value, indicating the number of times that said user utilized the second data-entry method to engage with said user-interface element during said particular usage session being reviewed;

(c) for all previous usage sessions of said user, that occurred within a pre-defined time period prior to the particular usage session being reviewed, calculating:
  (c1) a first-method aggregated occurrence value, indicating the number of times that said user utilized the first data-entry method to engage with said user-interface element during said previous usage sessions; and
  (c2) a second-method aggregated occurrence value, indicating the number of times that said user utilized the second data-entry method to engage with said user-interface element during said previous sage sessions;

(d) if it is determined that the first-method current-session occurrence value as calculated in step (b1), is smaller by at least a threshold percentage value relative to the first-method aggregated occurrence value as calculated in step (c1), then determining that said user is a cyber-attacker posing as said user.

23. A method comprising:

monitoring user interactions of a user, who utilizes a computing device to interact with a computerized service during a usage session;

for each particular type of data entry method that the user utilizes during said usage session:

calculating a current number of occurrences of utilization of said particular type of data entry method during said usage session, and generating output corresponding to said current number of occurrences during said usage session;

calculating a ratio between (A) said current number of occurrences of utilization of said particular type of data entry method during said usage session, and (B) an average number of occurrences of utilization of said particular type of data entry method during previous usage sessions of said user; and generating output corresponding to said ratio;

based on (i) said current number of occurrences, and (ii) said average number of occurrences during previous usage sessions of said user, determining whether said user is an authorized user or a cyber-attacker;

wherein the method comprises:

(a) for a particular type of user interaction with a user-interface element of said computerized service, defining at least:
  (a1) a first data-entry method that users can utilize via a mouse-unit to engage with said user-interface element, and
  (a2) a second data-entry method that users can utilize via a keyboard to engage with said user-interface element;

(b) for a particular usage session of said user, which is being reviewed for possible fraud, calculating:
  (b1) a first-method current-session occurrence value, indicating the number of times that said user utilized the first data-entry method to engage with said user-interface element during said particular usage session being reviewed; and
  (b2) a second-method current-session occurrence value, indicating the number of times that said user utilized the second data-entry method to engage with said user-interface element during said particular usage session being reviewed;

(c) for usage sessions of other users, that occurred within a pre-defined time period prior to the particular usage session being reviewed, calculating:
  (c1) a first-method aggregated occurrence value, indicating the number of times that said other users utilized the first data-entry method to engage with said user-interface element during their previous usage sessions;
  (c2) a second-method aggregated occurrence value, indicating the number of times that said other users utilized the second data-entry method to engage with said user-interface element during their previous usage sessions;
  (c3) a first-ratio value indicating a ratio between (A) the first-method aggregated occurrence value of other users as calculated in step (c1), and (B) the first-method current-session occurrence value as calculated in step (b1);
  (c4) a second-ratio value indicating a ratio between (A) the second-method aggregated occurrence value of other users as calculated in step (c2), and (B) the second-method current-session occurrence value as calculated in step (b2);

(d) if the first-ratio value is greater than a pre-defined threshold ratio value, then determining that said user is a cyber-attacker posing as said user.

24. The method of claim 23, comprising:

(A) automatically scanning the user interactions performed in usage sessions of a batch of other users of said computerized service;

(B) calculating separately for each account owner of said batch of other users,
  (B1) a first-method current-session occurrence value, indicating the number of times that said account owner utilized the first data-entry method to engage with said user-interface element during a particular usage session being reviewed;
  (B2) a first-method aggregated occurrence value, indicating the number of times that said other users except said account owner utilized the first data-entry method to engage with said user-interface element during their previous usage sessions;
  (B3) a first-ratio value indicating a ratio between (x) the first-method aggregated occurrence value calculated in step (B2), and (y) the first-method current-session occurrence value as calculated in step (B1);

(C) automatically generating a list of account owners, out of said other users of the computerized service, for which: the first-ratio value is greater than a pre-defined threshold ratio value.

25. The method of claim 18, comprising:

(A) automatically scanning the user interactions performed in usage sessions of a batch of other users of said computerized service;

(B) calculating separately for each account owner of said batch of other users, (B1) a first-method current-session occurrence value, indicating the number of times that said account owner utilized the first data-entry method to engage with said user-interface element during a particular usage session being reviewed;

(B2) a first-method aggregated occurrence value, indicating the number of times that said other users except said account owner utilized the first data-entry method to engage with said user-interface element during their previous usage sessions;

(B3) a first-ratio value indicating a ratio between (x) the first-method aggregated occurrence value calculated in step (B2), and (y) the first-method current-session occurrence value as calculated in step (B1);

(C) if the first-ratio value of said account owner is greater than a pre-defined threshold ratio value, then automatically determining that the account of said account user was exposed to a cyber-attack.

26. The method of claim 1, further comprising:

based on analysis of said user interactions, calculating a fraud-score value indicating a fraud-risk associated with said usage session;

generating and displaying on a screen of a computer located remotely from said user, a graphical user interface (GUI) element which comprises: (A) an indication of said fraud-score value; (B) an indication of a lowest-limit fraud-score value; (C) an indication of an upper-limit fraud-score value.

27. The method of claim 1, wherein the generating and displaying comprise:

generating and displaying on said screen of said computer located remotely from said user, an on-screen gauge representation which comprises: an on-screen needle representation pointing to a particular location along a circumference of said on-screen gauge representation, the on-screen needle representation indicating a value between said lowest-limit fraud-score value and said upper-limit fraud-score value.

28. The method of claim 1, wherein the generating and displaying comprise:

generating and displaying on said screen of said computer located remotely from said user, an on-screen partial-ring-shaped gauge representation which comprises: an on-screen needle representation pointing to a particular location along a circumference of said on-screen partial-ring-shaped gauge representation;

wherein a relative position of said particular location along the circumference of said on-screen partial-ring-shaped gauge representation, corresponds to the relative location of the fraud-score value along a number line that begins at the lowest-limit fraud-score value and ends with the upper-limit fraud-score value.

29. The method of claim 1, wherein the generating and displaying comprise:

generating and displaying on said screen of said computer located remotely from said user, an on-screen partial-ring-shaped gauge representation which comprises: an on-screen needle representation pointing to a particular location along a circumference of said on-screen partial-ring-shaped gauge representation;

wherein the circumference distance between said particular location and said indication of lowest-limit fraud-score value, divided by the circumference distance between said indication of lowest-limit fraud-score value and said indication of upper-limit fraud-score value, is generally equal to the fraud-score value minus the lowest-limit fraud-score value, divided by the difference between the upper-limit fraud-score value and the lowest-limit fraud-score value.

30. The method of claim 1, comprising:

based on analysis of said user interactions performed via a mouse unit, calculating a mouse dynamics fraud-score value indicating a fraud-risk associated with said usage session;

generating and displaying on the screen of said computer located remotely from said user, an on-screen generally-circular gauge element which comprises: (A) an indication of said mouse dynamics fraud-score value; (B) an indication of a lowest-limit fraud-score value associated with mouse dynamics; (C) an indication of an upper-limit fraud-score value associated with mouse dynamics.

31. The method of claim 1, comprising:

based on analysis of said user interactions performed via keyboard, calculating a keyboard dynamics fraud-score value indicating a fraud-risk associated with said usage session;

generating and displaying on the screen of said computer located remotely from said user, an on-screen generally-circular gauge element which comprises: (A) an indication of said keyboard dynamics fraud-score value; (B) an indication of a lowest-limit fraud-score value associated with keyboard dynamics; (C) an indication of an upper-limit fraud-score value associated with keyboard dynamics.

32. The method of claim 1, comprising:

based on analysis of timings of said user interactions, calculating a timing-related fraud-score value indicating a fraud-risk associated with said usage session;

generating and displaying on the screen of said computer located remotely from said user, an on-screen generally-circular gauge element which comprises: (A) an indication of said timing-related fraud-score value; (B) an indication of a timing-related lowest-limit fraud-score value;

(C) an indication of a timing-related upper-limit fraud-score value.

33. The method of claim 1, comprising:

based on analysis of access time reflected in said user interactions, calculating an access time fraud-score value indicating a fraud-risk associated with said usage session;

generating and displaying on the screen of said computer located remotely from said user, an on-screen generally-circular gauge element which comprises: (A) an indication of said access time fraud-score value; (B) an indication of access time lowest-limit fraud-score value; (C) an indication of access time upper-limit fraud-score value.

34. The method of claim 1, comprising:

based on analysis of said user interactions, calculating at least (A) a first fraud-score value associated with a first behavioral aspect reflected in said user interactions, and (B) a second fraud-score value associated with a second behavioral aspect reflected in said user interactions;

calculating a weighted fraud-score value based on said first fraud-score value and said second fraud-score value;

displaying, on the screen of said computer located remotely from said user, at least the weighted fraud-score value.

35. The method of claim 1, comprising:

based on analysis of said user interactions, calculating at least (A) a first fraud-score value associated with a first behavioral aspect reflected in said user interactions, and (B) a second fraud-score value associated with a second behavioral aspect reflected in said user interactions;

calculating a weighted fraud-score value based on said first fraud-score value and said second fraud-score value;

generating and displaying, on the screen of said computer located remotely from said user, an on-screen interface which comprises: (x) a first gauge indicating the first fraud-score value; (y) a second gauge indicating the second fraud-score value; (z) a third gauge indicating the weighted fraud-score value.

36. The method of claim 1, comprising:

detecting and storing in a repository the Internet Protocol (IP) address of each usage session of said user with the computerized service;

converting each IP address of each usage session of said user, into a geo-spatial location on Earth;

displaying a graphical representation of a map of Earth;

displaying on said map of Earth multiple representations of pins, wherein the number of pins displayed is equal to the number of usage sessions of said user with the computerized service, wherein each pin is displayed at a map location that corresponds to the geo-spatial location on Earth from which a corresponding usage session of said user has occurred.

37. The method of claim 1, comprising:

detecting and storing in a repository the Internet Protocol (IP) address of each usage session of said user with the computerized service;

converting each IP address of each usage session of said user, into a geo-spatial location on Earth;

displaying a graphical representation of a map of Earth;

displaying on said map of Earth multiple representations of pins, wherein the number of pins displayed is smaller than the number of usage sessions of said user with the computerized service, wherein each pin is displayed at a map location that corresponds to the geo-spatial location on Earth from which at least one corresponding usage session of said user has occurred, wherein each pin further displays a numeric value that indicates the aggregate number of usage sessions of said user that occurred from multiple geo-spatial locations that are within a pre-defined radius around the map location to which said pin points.

38. The method of claim 1, comprising:

detecting and storing in a repository the Internet Protocol (IP) address of each usage session of said user with the computerized service;

converting each IP address of each usage session of said user, into an IP-based geo-spatial location on Earth;

determining an actual geo-spatial location on Earth for each one of said usage sessions of said user, based on a combination of both: (A) said IP-based geo-spatial location, and (B) at least one more parameter selected from the group consisting of: a language in which said user interacts with the computerized service, a language in which a keyboard of said user is able to type, a language that said user selected for user interface of said computerized service;

displaying a graphical representation of a map of Earth;

displaying on said map of Earth multiple representations of pins, wherein the number of pins displayed is equal to the number of usage sessions of said user with the computerized service, wherein each pin is displayed at a map location that corresponds to the actual geo-spatial location on Earth from which a corresponding usage session of said user has occurred.

* * * * *